United States Patent
Glaser et al.

(10) Patent No.: US 10,613,823 B2
(45) Date of Patent: *Apr. 7, 2020

(54) SYSTEM AND METHOD FOR DIFFERENTIALLY LOCATING AND MODIFYING AUDIO SOURCES

(71) Applicant: Grabango Co., Piedmont, CA (US)

(72) Inventors: William Glaser, Berkeley, CA (US); Brian Van Osdol, Piedmont, CA (US)

(73) Assignee: Grabango Co., Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/528,534

(22) Filed: Jul. 31, 2019

(65) Prior Publication Data
US 2019/0354343 A1 Nov. 21, 2019

Related U.S. Application Data

(63) Continuation of application No. 15/717,753, filed on Sep. 27, 2017, now Pat. No. 10,409,548.

(60) Provisional application No. 62/400,591, filed on Sep. 27, 2016.

(51) Int. Cl.
| | |
|---|---|
| *G06F 3/16* | (2006.01) |
| *H04R 29/00* | (2006.01) |
| *G06F 3/0482* | (2013.01) |
| *H04R 1/40* | (2006.01) |
| *G06K 9/00* | (2006.01) |
| *H04R 3/00* | (2006.01) |
| *H04N 5/232* | (2006.01) |
| *H04R 25/00* | (2006.01) |

(52) U.S. Cl.
CPC ............ *G06F 3/165* (2013.01); *G06F 3/0482* (2013.01); *H04R 3/005* (2013.01); *H04R 29/001* (2013.01); *H04R 29/005* (2013.01); *G06K 9/00335* (2013.01); *H04N 5/23229* (2013.01); *H04R 1/406* (2013.01); *H04R 25/43* (2013.01); *H04R 25/558* (2013.01); *H04R 2225/41* (2013.01); *H04R 2225/43* (2013.01); *H04R 2225/55* (2013.01); *H04R 2420/01* (2013.01); *H04R 2430/01* (2013.01); *H04R 2430/20* (2013.01); *H04R 2460/07* (2013.01); *H04S 2400/15* (2013.01)

(58) Field of Classification Search
CPC ....... G06F 3/165; G06F 3/0482; H04R 1/496; H04R 29/001; H04R 3/005; G06K 9/00335
USPC .......................... 381/56, 58, 59, 60, 57, 312
See application file for complete search history.

(56) References Cited

U.S. PATENT DOCUMENTS

2002/0122559 A1* 9/2002 Fay ...................... G10H 1/0041
381/119
2015/0124973 A1* 5/2015 Arteaga ..................... H04S 3/00
381/22

* cited by examiner

*Primary Examiner* — Thjuan K Addy
(74) *Attorney, Agent, or Firm* — Alpine Patents LLC; Brian Van Osdol

(57) ABSTRACT

A system and method for differentially locating and modifying audio sources that includes receiving multiple audio inputs from a set of distinct locations; determining a multi-dimensional audio map from the audio inputs; acquiring a set of positional audio control inputs applied to the audio map, each audio control input comprising a location and audio processing property; and generating an audio output according to the audio control inputs and the audio inputs. The audio control inputs capable of configuration through manual, automatic, computer vision analysis, and other configuration modes.

27 Claims, 16 Drawing Sheets

SYSTEM AND METHOD FOR DIFFERENTIALLY LOCATING AND MODIFYING AUDIO SOURCES

CROSS-REFERENCE TO RELATED APPLICATIONS

This Application is a continuation application of U.S. patent application Ser. No. 15/717,753, filed on 27 Sep. 2017, which claims the benefit of U.S. Provisional Application No. 62/400,591, filed on 27 Sep. 2016, which is incorporated in its entirety by this reference.

TECHNICAL FIELD

This invention relates generally to the field of audio manipulation, and more specifically to a new and useful system and method for differentially locating audio modifications, to associate with sources.

BACKGROUND

An environment with multiple audio sources can complicate communications between different agents. A person may want to listen, carry on a conversation, or otherwise engage with one or more people, but various sources of noise can detract from hearing others or being heard. This is particularly true for the hearing impaired that rely on hearing aids and other devices to assist with hearing. Similarly, at a presentation or live performance, there may be various sources of sounds that may detract from following the main focus. In some meeting situations, there are sometimes multiple conversation threads that will be going on with different levels of importance and intended for different scopes of audiences. Noisy environments may additionally hamper the ability for a computing system to use audio interfaces. In particular, audio interfaces are generally limited to directly listening to a controller speaking to a microphone device—this setup may not be suitable for every situation.

Thus, there is a need in the audio manipulation field to create a new and useful system and method for differentially locating audio modifications such that they differentially apply to different audio sources. This invention provides such a new and useful system and method.

DESCRIPTION OF THE EMBODIMENTS

Figure 1:
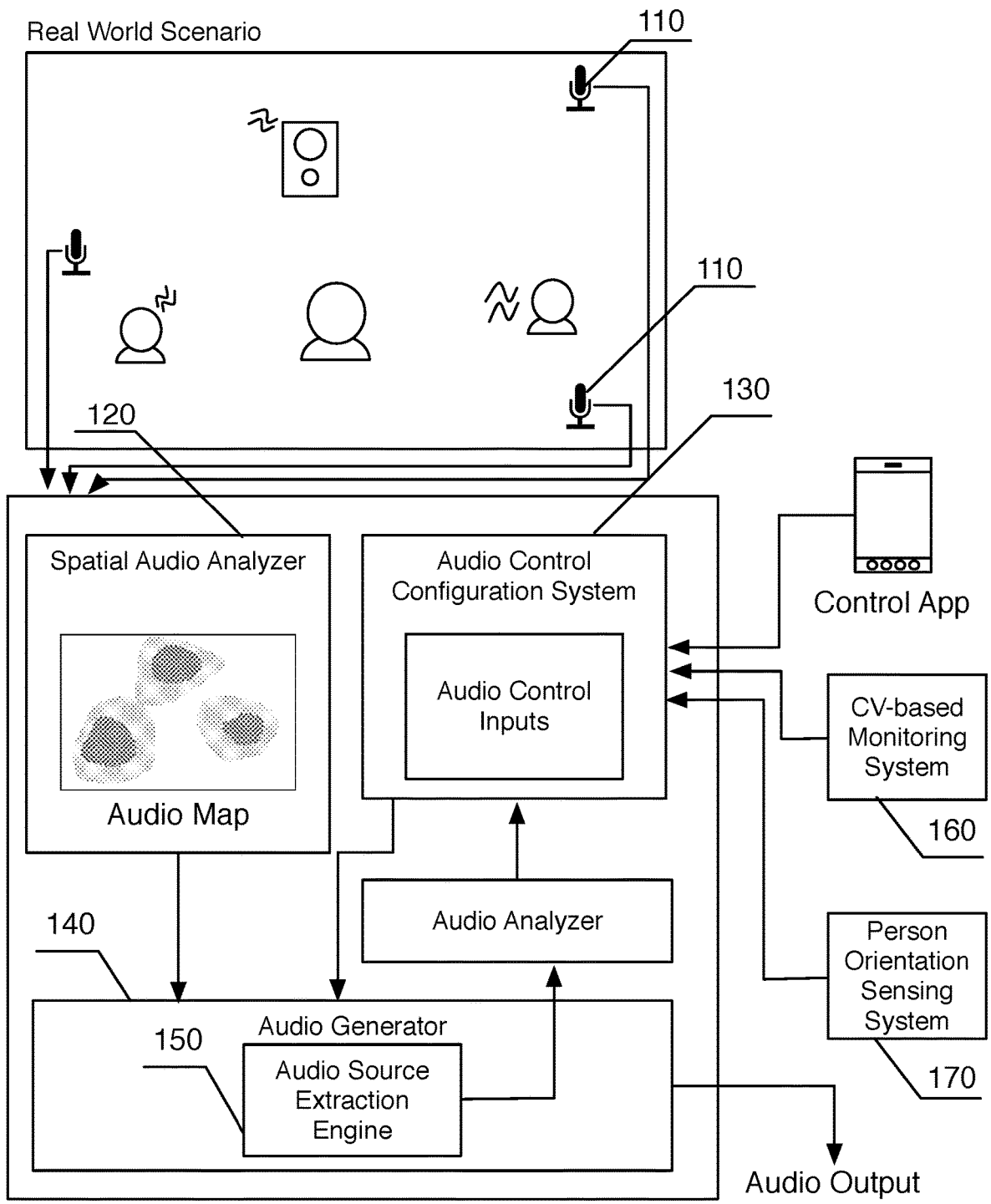
FIGS. 1-3 are a schematic representations of a system of a preferred embodiment.

The following description of the embodiments of the invention is not intended to limit the invention to these embodiments but rather to enable a person skilled in the art to make and use this invention.

1. Overview

A system and method for differentially locating and modifying audio sources of a preferred embodiment generates a positional map of audio sources and applies active audio modifications of audio sources based on mapped position of identified audio source. Audio modifications include amplification, deamplification, equalization, filtering, compression, isolation, synthesizing to a second audio streams, combining audio sources, and/or any number of other audio modifications. This can be used to apply customized handling of distinct audio sources within an environment. The system and method is preferably applied for generating audio for one user, but can additionally be used for generating multiple customized audio outputs for different audiences (e.g., multiple users).

In one preferred application, the system and method may be used in generating an audio stream that is composed of selected audio sources detected within the environment. Herein, audio sources refers to audio characterized as originating from some source such as a person, speaker, machine, or other suitable sources of sound. The audio sources are preferably extracted into an audio data representation of the audio source. The audio processing of audio sources may additionally be individually controlled. More specifically, customized audio adjustments and processing can be applied to audio signals originating from a location or region. Some locations may be amplified and other locations may be deamplified. In this way, one exemplary application may be to minimize audio from one set of sources and to amplify or enhance audio from a second set of sources.

The system and method preferably expose a positional map of audio, which may be used in enabling various approaches for setting, and modifying generated audio. Audio control inputs are settings used in configuring audio generation. The audio control inputs can be set for different locations of the audio map and preferably for particular audio sources. Some preferred modes of controlling generated audio can include manual selection within a graphical representation of sources, audio content analysis, computer vision (CV) based analysis of the environment, agent environment orientation (e.g., person position and/or body directed orientation), and applying preconfigured settings based on detected conditions.

In one variation of enabling manual selection, the system and method can provide a visual representation of the audio landscape around a user. More specifically, the system and method can offer a user interface that can be used to control generated audio through specifying audio control input for different locations or regions in the environment. As an exemplary implementation, a user can use a smart phone application to view a graphical representation of an audio map near the user. The user can then use simple actions to set different positional audio control inputs for different locations or regions on the audio source map. The audio control inputs can specify a location/region and types of audio modifications such as how to adjust the volume and/or equalize the audio originating from that location. The set of positional audio control inputs are then used to generate/augment an audio signal that drives a personal audio system. For example, a user may use his smart phone to selectively mark different locations to amplify her friends sitting around her while reducing the volume of the background music and others sitting nearby, but who are not of interest. As another example, a user may choose to reduce the low frequency signals from a human speaker or selectively amplify just the frequencies used in human speech.

In a variation enabling automatic setting of audio control inputs, audio control inputs may be automatically set and adjusted dynamically based on analysis of the audio, audio sources, audio content, and/or the audio map. For example, detection of audio sources may be achieved through analysis of the audio map, and then isolated audio from each audio source may be analyzed to determine its significance to determine how it's individual volume is set during generation of a compiled audio output. In another example, speech content and, in particular, speech content detected to be part of conversation may be enhanced while music, machine noise, background chatter, and/or other audio sources can be classified as such and deamplified from the audio output.

In a variation using supplementary environment sensing, an imaging system with a computer vision (CV) based monitoring system can generate CV-based interpretations of the environment that can be used in setting audio control inputs. Visual detection and classifications of objects can be mapped to audio sources, and visually detected details like the direction of attention of one or more people can be used in setting the audio control inputs. For example, the audio output generated for a user may be at least partially based on the visual detection of where the user is directing his or her attention. As a related variation, alternative sensing systems can be used in addition to or in place of a CV-based system. In one variation, sensing of an agent's environment orientation may be used in setting audio control inputs. The position and/or direction orientation of an agent (e.g., a person) can be used to set audio control inputs.

The system and method can have applications in various forms of environments. In one preferred use case, the system and method are used in facilitating assisted conversations in environments with multiple conversations. In particular, the system may be used by attendees at presentations, performances, and conferences to enhance their ability to communicate to different people at different times. For example, a user could selectively transition between targeting their listening to a presenter and to a group of colleagues sitting nearby.

In another use case, the system and method are used in combination with a listening device (e.g., hearing assistance app, a hearing aid, cochlear implant, etc.). In one implementation, a listening device can include an operating mode that can use positional audio control inputs specified by a connected user application to augment the audio of the hearing aids. Furthermore, other users (that may or may not use a similar listening device) can use a connected application or recording device to collecting of audio input from different locations to facilitate generation of an audio map.

In another use case, the system and method are used in an environment that provides public ambient computing. This will generally be where a computing system is interested in collecting isolated audio input from distinct groups of people. In places of commerce, this may be used to enable people within a store to issue audio commands that are uniquely associated with that particular person. For example, an environment equipped with a CV-based monitoring system such as the one described in U.S. patent application Ser. No. 15/590,467, filed 9 May 2017, which is hereby incorporated in its entirety by this reference, may include microphones integrated with the imaging system that are distributed through an environment, and then use the system and method may be used for detecting audio commands associated with distinct users. As another example, a store may use this within their store so that workers can be enabled to issue audio commands without wearing any personal audio recording equipment. General audio recording of the environment possibly coupled with CV-based monitoring of the environment can be used to pickup and isolate audio sources from workers.

As one potential benefit, the system and method may enable various complex forms of layered audio processing within complex audio environments. The system and method can preferably address some of the challenges present in environments where there are multiple, competing, and overlapping audio sources.

As a related potential benefit, the system and method may be used to generate different audio outputs that use customized processing of audio sources in an environment. For example, within one environment and from a shared set of audio input, distinct audio outputs may be generated, where the distinct audio outputs may be compiled from unique sets of audio sources. In other words, a first and second user can each customize whom they want to listen to independent of the other user.

As another potential benefit, the system and method may enable a variety of modes of controlling generated audio output. In some variations, various sensing and content analysis may be used to drive different forms of audio control. As mentioned audio content analysis and/or CV-based environment monitoring may be used to augment the generation of audio output.

2. System for Differentially Locating and Modifying Audio Sources

As shown in FIG. 1, a system for differentially locating and modifying audio sources of a preferred embodiment can include a set of microphones 110, an spatial audio analyzer 120, an audio control configuration system 130, and an audio generator 140 with an audio source extraction engine 150. The set of microphones no is configured to record or otherwise collect audio signals from a set of distinct locations. The spatial audio analyzer 120 is configured to produce a multi-dimensional audio map from audio input record by the set of microphones 110. The audio configuration system 130 is preferably configured to acquire and set one or more positional audio control inputs that define audio processing for one or more location of the audio map. An audio generator 140 is preferably configured to generate at least one audio output based on audio input collected from the set of microphones. The audio generator can include the audio source extraction engine 150, which is configured to extract or substantially isolate at least one audio source that is used in compiling the audio output. In preferred instances, the audio output is a compiled set of layered audio sources.

The set of microphones 110 functions to acquire multiple audio inputs from a set of distinct locations. The set of microphones 110 can operate as an microphone array with at least two microphones and preferably three or more that collect audio recordings from different vantage points. The microphones 110 in combination with the spatial audio analyzer 120 generate a map of audio sources (i.e., an audio map). The audio map is preferably a two-dimensional map but may alternatively be three-dimensional or represented in any suitable format.

The microphones 110 can be omnidirectional microphones but may alternatively be directional microphones. Orientation of directional microphones may be used to facilitate locating audio source position.

Figure 2:
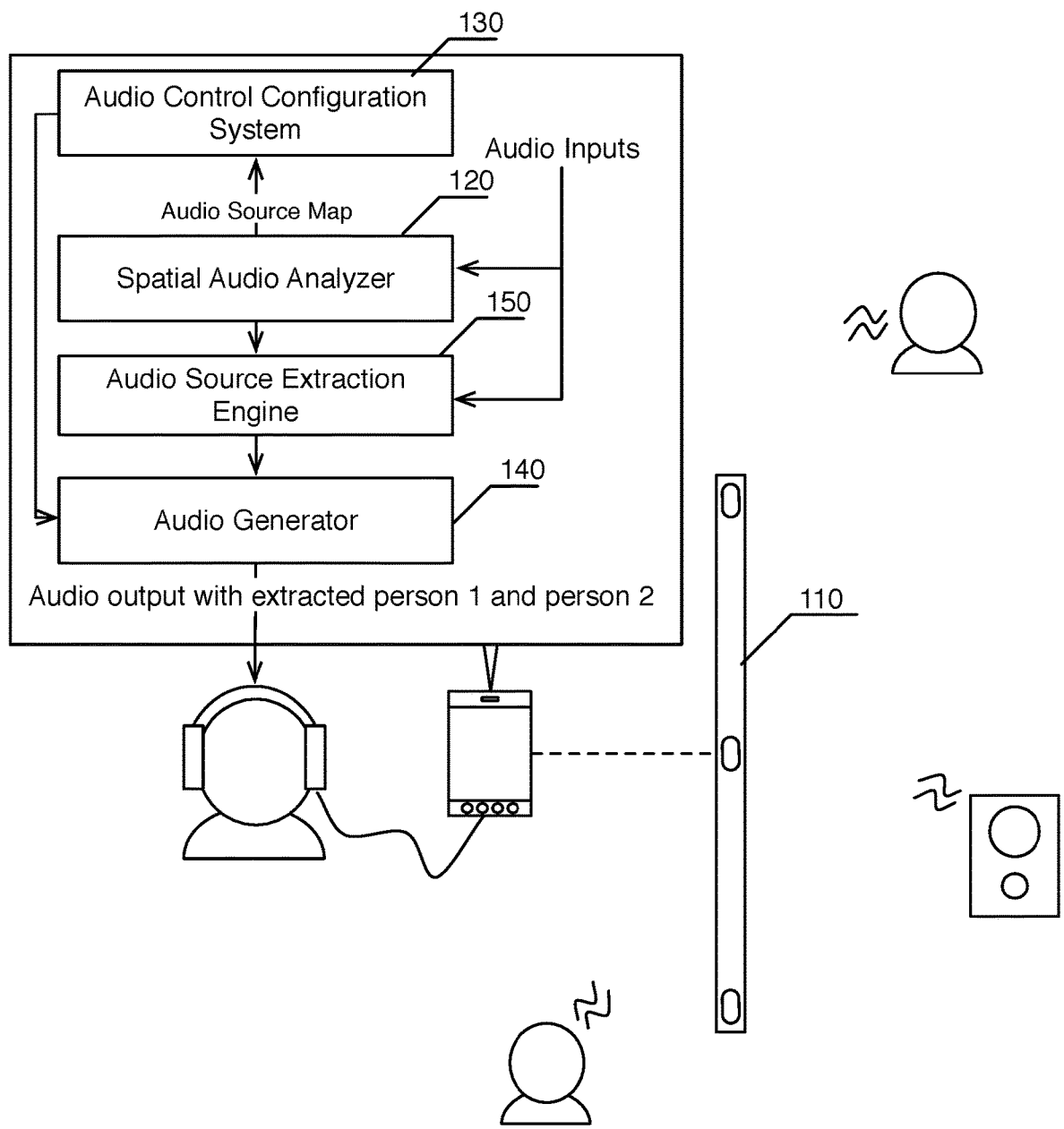

In one implementation, the set of microphones 110 is a set of microphones that are mechanically coupled through a structure. Each microphone serves as distinct audio sensor that is positioned within the environment. For example, a speakerphone in a conference room may have a set of microphones at distinct points. In another example, microphones may be installed in various parts of the environment. When the system includes a CV-based monitoring system, microphones may be integrated into the imaging devices distributed across an environment. In another exemplary implementation, the set of microphones 110 can be a microphone array unit that is a telescoping device that a user could carry and easily extend and set on a surface when the user wants to use the system as shown in FIG. 2.

Figure 3:
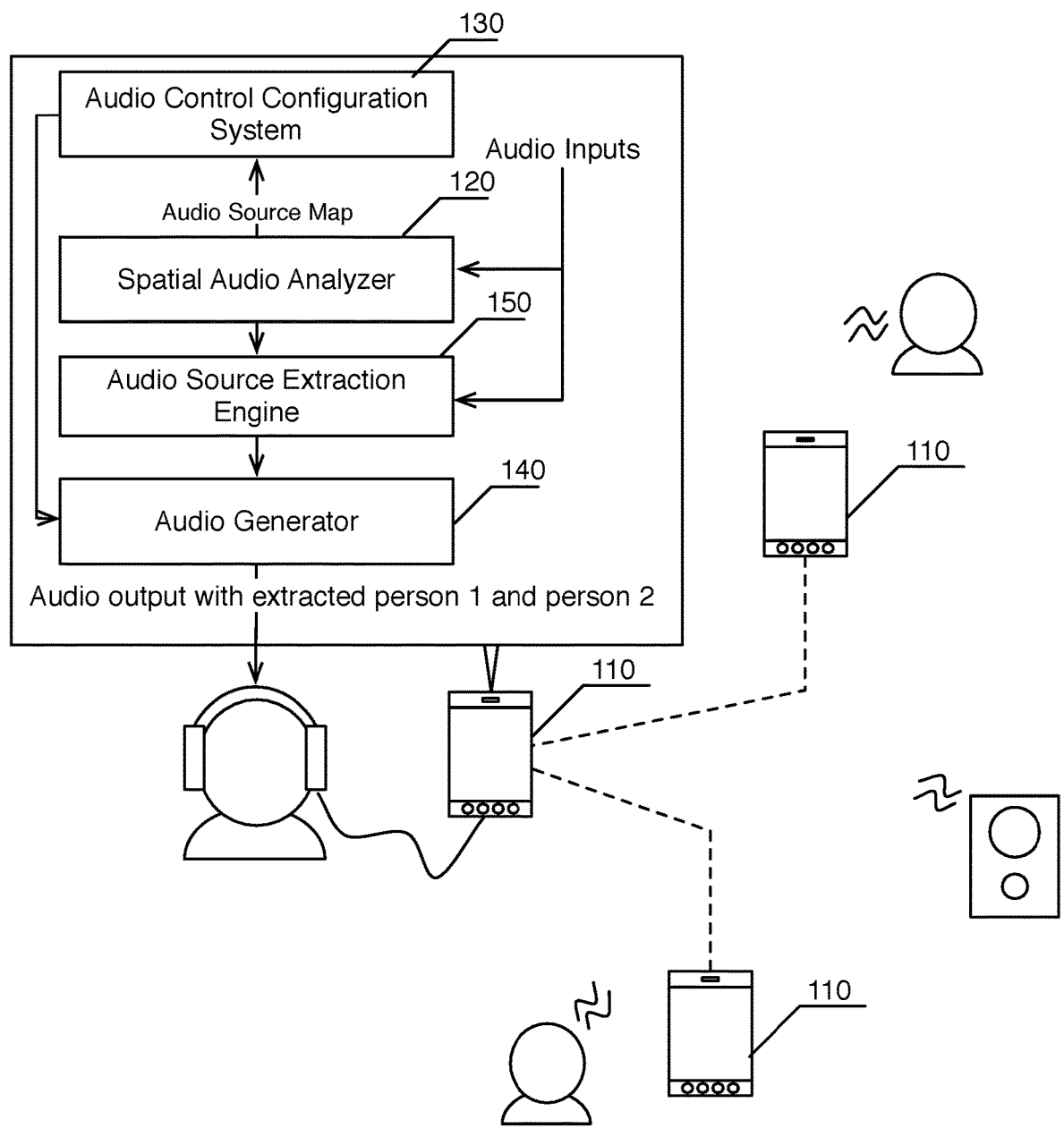

In another implementation, the set of microphones includes a distributed set of personal computing devices capable of recording audio. The distributed recording device variation can preferably enable ad-hoc implementation of the system in different environments. In one exemplary implementation, multiple smart phones of different users could act collectively as a microphone array as shown in FIG. 3. In another exemplary implementation, the microphones integrated into hearing aids and worn in or on a user's ears may serve to collect audio input.

The relative positioning of the microphones is preferably known. Alternatively, approximate relative positioning may be specified through a user interface. For example, a user may mark where connected microphones are located. As another alternative, a calibration process could be used to approximate relative positioning. This calibration phase might include calibration pings that come from one source at a time, or rely instead on the passive background audio. As yet another alternative, microphones can be paired with speakers, as is naturally the case with smartphones, to facilitate the automatic calibration process. In another variation, CV-based monitoring of the environment can detect and/or predict locations of microphones and their relative positioning. In the case where a microphone is coupled to an imaging device, image mapping of overlapping areas of an imaging data or 3D reconstruction of the space may be used to approximate the relative positioning of the imaging devices and thereby the relative positioning of the audio microphones.

The spatial audio analyzer 120 functions generate an audio map from multiple audio inputs. The spatial audio analyzer 120 preferably uses one or more forms of acoustic source localization. The spatial audio analyzer 120 preferably includes configuration to analyze the relative delay in arrival time of audio signals detected from the collected audio inputs, and uses such time delay phase shift detection to produce a map of audio sources in space.

Figure 4:
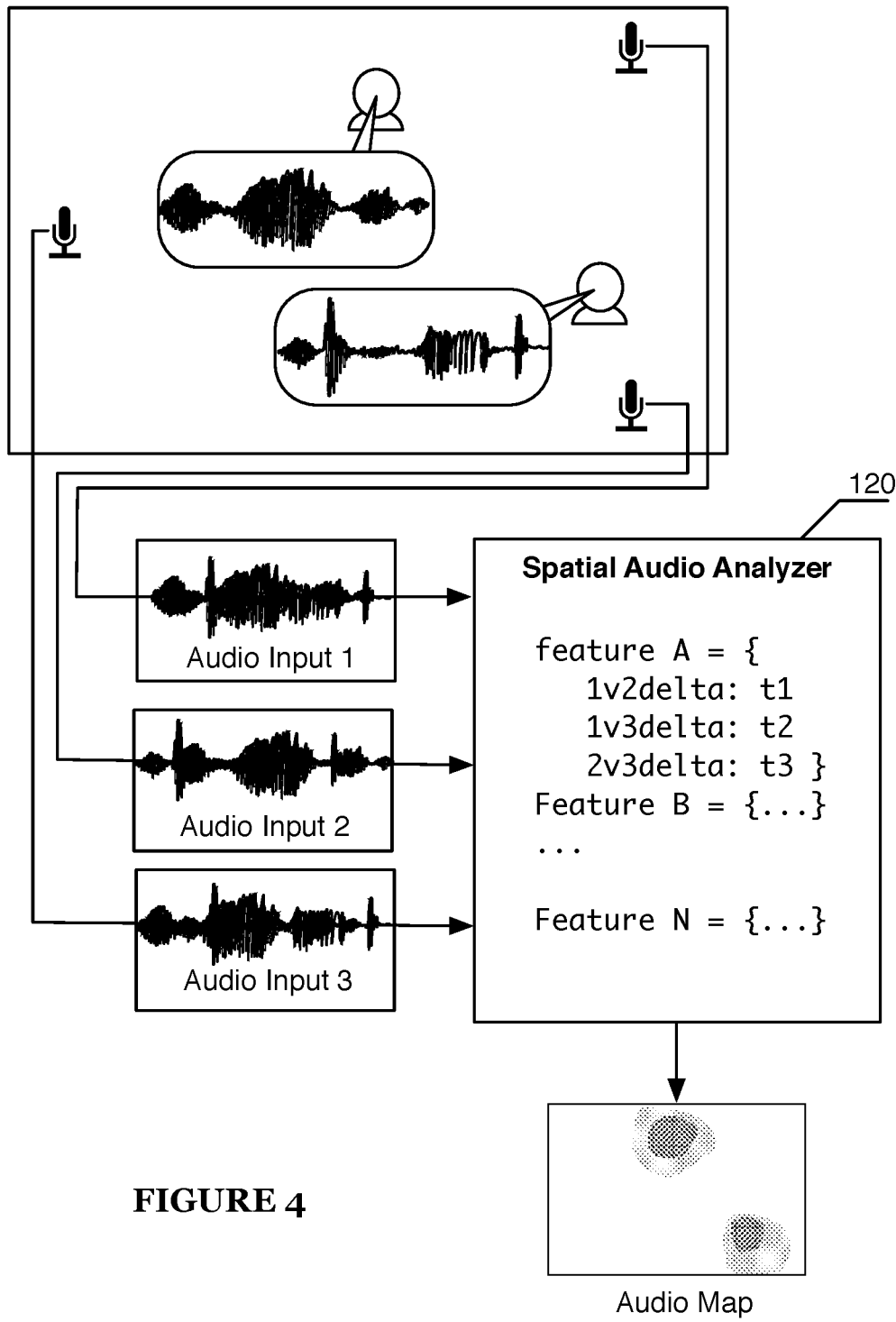
FIG. 4 is a schematic representation of generating an audio map from multiple audio inputs.

Multiple audio sources may be recorded in the multiple audio inputs with different phase shifts depending on the positioning of the audio source to the respective microphones. In one implementation, audio feature detection can be applied to detect different audio features indicative of an audio source. The time delay phase shift of audio features between different audio inputs can be calculated and then used in triangulating a location. Various forms of signal processing, machine learning, and/or other forms of analysis may be used in mapping subcomponents of an audio input to different locations. As one example a frequency domain signal of the audio inputs may be analyzed in detecting and segmenting audio features that share common time differences. As shown in the simplified scenario of FIG. 4, audio generated at different points will be recorded as overlapping signals. Audio feature detection can be used across the audio inputs and the time delay in the different audio inputs used in calculating location. An audio map can be generated by performing such a process across multiple audio features. In another implementation, a deep learning model trained on locating of audio sources may be used. Other suitable audio locating processes may additionally or alternatively be used.

As mentioned, the audio map is preferably two-dimensional but may alternatively be three-dimensional or represented in any suitable format. The spatial audio analyzer uses differences in the audio signals, triangulation, and time of flight of sound to approximate location of different audio components in the audio inputs. The resulting audio map is preferably a time-series data representation of audio as generated across the multi-dimensional space.

In some alternative implementations, the spatial audio analyzer 120 may generate alternative forms of audio maps. For example, a radial view of the directionality of audio sources may be an alternative form of an audio map. A radial view may suitable in situations where a microphone array is positioned on a table and the expected sources of audio originate around the microphone array at varying distances. Other alternative forms of a map can similarly be used, which would generally be customized to the use case and/or configuration of the microphones.

The audio control configuration system 130 functions to enable the customization of the audio output by setting positional audio control inputs to the audio map. An audio source input is preferably configuration that characterizes how audio is to be extracted from the audio input and modified into an audio output. The generation of audio output by the audio generator 140 will preferably involve extracting audio from locations indicated by the audio control inputs and thereby forming distinct audio source channels and then optionally combining and/or processing the audio source channels.

An audio source input preferably includes a location property and one or more audio processing operator property. The location property can be a distinct point, but may alternatively be a region. In some variations, it may additionally be mapped to a particular source in addition to location. For example, some implementations may us CV-based monitoring system to determine that a machine and a person are in the same general location, and two audio control inputs may be assigned to that same general location but individually assigned to audio generated by the machine (e.g., noise) and audio generated by the person (e.g., speech).

The audio processing operators can be various transformations that are to be applied to audio source channel isolated or extracted on behalf of the audio source input. Audio processing operators may include amplification, deamplification, audio equalization, filtering, compression, speed changes, pitch shifts, synthesizing to a second audio stream (e.g., translating to another language and then generating speech audio in the other language), or other suitable audio effect. For audio sources of interest, the audio processing operator can enhance the audio from that audio source. Audio processing operators may not always be constructive enhancements. As on example, ambulance drivers may use this system to reduce the noise coming from their own siren so as to better hear each other and they passengers. This reduction may rely on location, frequency, or some other form of source identification. An audio source input may additionally characterize other operational features such as enabling recording, speech to text, censoring or content monitoring (e.g., content analysis and blocking of illicit content), streaming to another destination, or any suitable type of analysis or processing. An audio source input can have any suitable number of processing operators that are configured to be applied in any suitable configuration. In some instances, the audio source channel after extraction is not additionally processed.

The audio control configuration system 130 may offer one or more of a variety of configuration modes such as a manual configuration mode, an automatic configuration mode, a CV-based configuration mode, and/or a positioning configuration mode. The various modes may additionally be used in combination. Settings of a user for an audio control configuration system 130 may initialized for every new environment. Alternatively, settings may be stored as part of a profile so that they can be automatically enabled. Settings may be stored for a particular room/environment, location, condition, speaker, person, audio source, or other suitable scope.

In a variation with a manual configuration mode, the audio control configuration system 130 can enable manual setting and editing of audio control inputs. A manual configuration mode preferably includes a graphical audio control interface configured to set different audio control inputs at different locations of a representation of an audio map. The audio control inputs can be graphically and interactively mapped to locations of the audio map in a user interface.

A manual configuration mode of the audio control configuration system 130 preferably includes a control application operable on a personal computing device or any suitable computing device. The control application can be an app, web application, or other suitable interface. The control application may alternatively be part of a dedicated controller. For example, the system may include hearing aids with a physical remote control that includes the control application.

Figure 5:
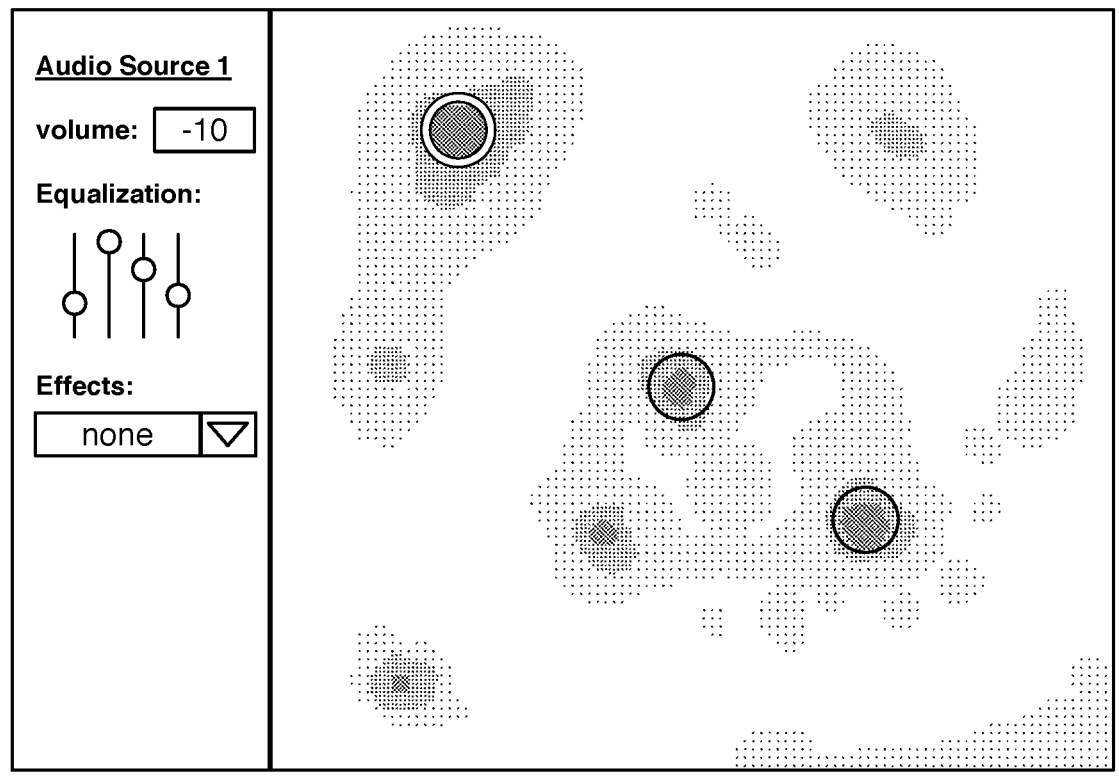
FIG. 5 is an exemplary representation of a control interface.

The control application preferably graphically represents the map of audio sources as shown in FIG. 5. In one implementation, the control application can display a heat map where color maps to amplitude or frequency profile of audio originating from a particular point or region. In this way, audio sources may be graphically detectable in a visual manner. In one variation, the map can display a live representation of the audio sources so that fluctuations in amplitude may facilitate the user determining what audio maps to what space in the graphic. In another implementation, the control application may represent distinct sources of audio with a static or animated graphic, or one representing richer information. For example, automatic classification of an audio source may enable audio sources to be represented by graphical classifications (e.g., person, audio system, noise source, etc.).

The graphical representation can additionally be synchronized to the position and orientation of the control application. In one variation, the graphical representation of the audio map may be overlaid or synchronized with real-world imagery to provide an augmented reality view of audio sources. When coupled with an image stabilized, heads up display, audio modification may be associated with objects in the visual rendering. Alternatively, image data collected from an imaging device may be able to provide a visual representation of the environment. For example, a surveillance system installed in an environment may be used to create an overhead 2D view of the environment with an overlaid audio map. An accelerometer, gyroscope, or compass (electronic or otherwise) could also be used to rotate and translate the visual representation appropriately as the viewing screen is moved.

The control application can additionally include some user interaction that supports adding, customizing, and/or removing positional audio control inputs. The audio control inputs can preferably be added to a representation of an audio map. A positional audio control input characterizes the desired audio modifications to be applied to audio originating at or near a particular position. A user may be able set amplification, deamplification, audio equalization, filtering, compression, speed changes, pitch shifts, synthesizing to a second audio stream (e.g., translating to another language and then generating speech audio in the other language), or other suitable audio effect.

In one implementation, a user can tap a location on the audio map to set a point and then use pinching and spreading gestures on a touch device to decrease or increase the volume at that point. Additional configuration gestures could also be supported to set audio equalization or other modifications. Other forms of touch input such as sideways pinches, double and triple taps, pressure-sensitive presses, and/or other forms of inputs may be mapped to how audio processing operators are set for an audio control input.

The location of an audio control input may be manually set. For example, a user may be able to tap at any location to specify a new audio control input that is applied to audio associated with that region. In a preferred usage scenario, a user will self-identify probable locations of an audio source and set the location of an audio control input to that location. Alternatively, automatic detection of audio sources may be performed in setting the location and audio processing operators are configured or edited by a user. A user interface may limit setting of audio processing operators to the audio control inputs instantiated for automatically detected audio sources.

Figure 6:
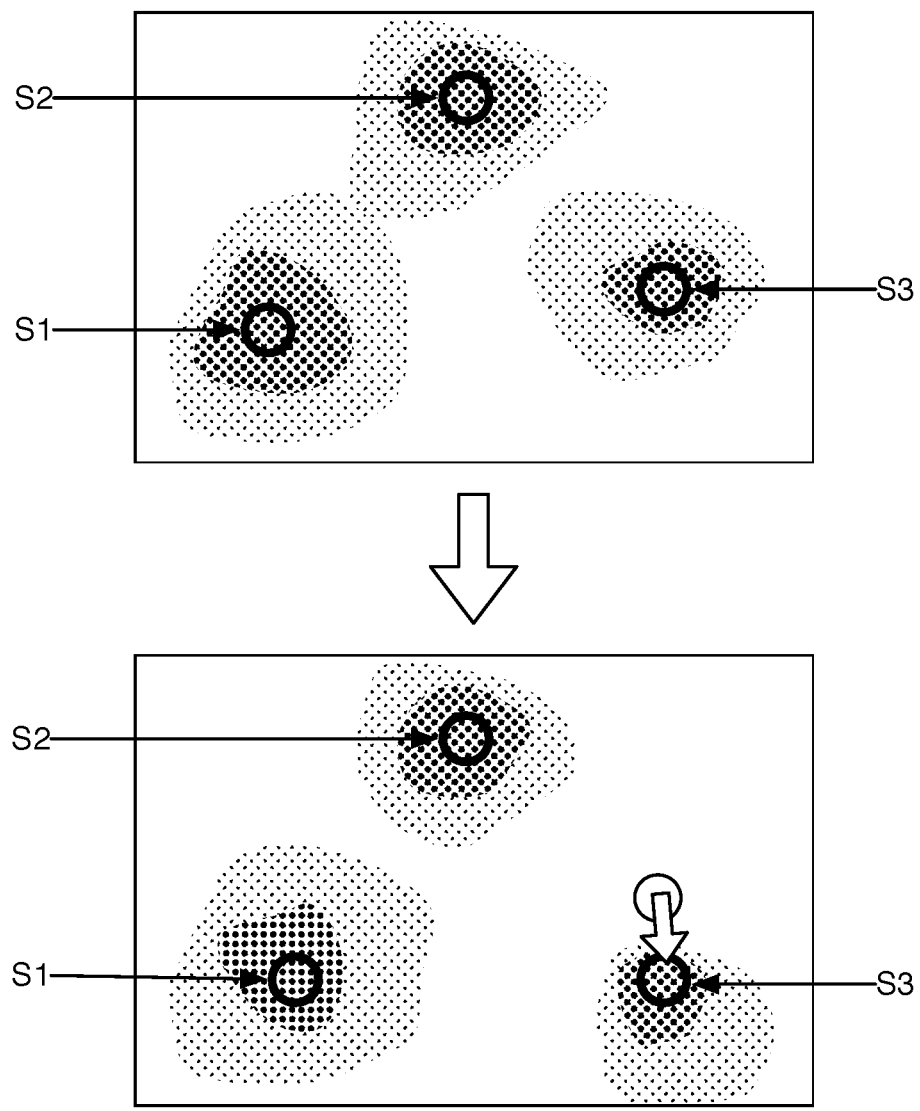
FIG. 6 is a schematic representation of tracking an audio source.

In some variations, the location of an audio control input can track an audio source. When a audio control input is established, the audio properties at that position may provide a set of characteristics that can be used to track motion as shown in FIG. 6. The audio properties can include the magnitude, frequency distribution, pitch center, automatic classifications (e.g., music, voice, etc.), and/or other properties. This set of characteristics can be used, for example, to identify a person of particular interest to the user, and track her position, and differentially modify her voice to make it easier to discern to the user. Additionally or alternatively, a lock on an audio source may track the audio source of incremental changes in location. Furthermore, audio sources can be tracked using other supplementary sensing systems such as a global positioning system, a local positioning system, RFID, near field communications, computer vision, lidar, ultrasonic sensing, sonic, and/or other suitable tracking systems.

In a variation with an automatic configuration mode, the audio control configuration system 130 can enable audio control inputs to be partially or fully configured. As described above, automatic configuration may be used to supplement other configuration modes like locating and tracking of an audio control input. Audio sources can be configured to be detected through analysis of the audio map. The audio sources may then be classified or identified. This can be used in distinguishing users, speakers, and/or other sources of sound. Users may additionally be identified or classified. For example, speaker detection may identify a user.

Audio processing operators of an audio control input may be automatically set through an automatic configuration mode. Different audio processing operators may be set based on various factors such as: audio source classification; audio source location; relative positioning of audio sources, subjects of the audio output, and/or other objects in the environment; and/or analysis/content of an audio source.

In one variation, the audio from the audio source can be extracted through the audio source extraction engine 150 and then processed to determine subsequent processing before possible use in the audio output. In one variation, the audio content can be classified. Audio content that is classified as speech may additionally be converted to text and then various forms of content analysis can be performed. For example, the significance of the content may determine whether that audio source is amplified or deamplified/muted. In another example, the content of multiple speakers may be analyzed to determine other content that is part of a shared conversation so that a listener can follow a conversation while reducing the interference of a competing conversation. Analysis of multiple audio sources may alternatively be used for any suitable form of scenario analysis in determining how audio processing should be applied for an audio output.

In a variation with an a CV-based configuration mode, the audio control configuration system 130 can use image-based monitoring to set or augment the setting of one or more audio control inputs. A system with a CV-based configuration mode preferably includes a CV-based monitoring system 160 with access to an imaging system. The CV-based monitoring system 160 is preferably used in performing image analysis to generate an interpretation that can be used in setting of an audio control input.

As one aspect, the CV-based monitoring system 160 may provide a supplementary sensing mechanism for identifying audio sources. In one variation, an imaging system in connection with the CV-based monitoring system 160 is employed to locate potential sources and then to associate audio source channel streams with those sources. A source might be a person, loudspeaker, machine, or another object. The various sources can be identified and counted as potential audio sources that can be assigned an audio control input. Visually detected potential audio sources may also be used in generating the audio map. For example, visually identified potential audio sources and their visually identified locations may provide a starting point for isolating audio source channels form a set of audio inputs. In another variation, biometric visual identification of people can be performed, and audio control inputs that were pre-configured for that person can be assigned.

As another aspect, the CV-based monitoring system 160 may detect the direction of attention. For example, the CV-based monitoring system 160 can detect where a subject is looking and set the audio control inputs so that the audio corresponds to the audio source(s) receiving attention by the subject. Attention in one implementation can include body, head, and/or gaze direction. In a similar variation, the attention of multiple subjects can be detected, and then the combined group attention may be used. This can be used in a conference setting to transition between people who have the focus of a group of people.

A CV-based monitoring system 160 may function to process and generate conclusions from one or more sources of image data. The CV-based monitoring system 160 can provide: person detection; person identification; person tracking; object detection; object classification (e.g., product identification); object tracking; extraction of information from device interface sources; gesture, event, and/or interaction detection; scene description; and/or any suitable form of image data analysis using computer vision and optionally other processing techniques. The CV-based monitoring system 160 is preferably used to drive CV-based applications of an interaction platform. In one exemplary scenario of CV-based commerce, the CV-based monitoring system 160 may facilitate generation of a virtual cart during shopping, tracking inventory state, tracking user interactions with objects, controlling devices in coordination with CV-derived observations, and/or other interactions. The CV-based monitoring system 160 will preferably include various computing elements used in processing image data collected by an imaging system. In particular, the CV-based imaging system is configured for detection of agents (e.g., people, robotic entity, or other entity that may be a subject of interest) and generation of a virtual cart based on interactions between people and products. Other suitable CV-based application may alternatively be used such as security monitoring, environment analytics, or any suitable application. In some variations, the CV-based monitoring system 160 may exclusively be used in supplementing the operation of the system A CV-based monitoring system 160 will include or have access to at least one form of an imaging system that functions to collect image data within the environment. The imaging system preferably includes a set of image capture devices. The imaging system might collect some combination of visual, infrared, depth-based, lidar, radar, sonar, ultrasound reflection, and/or other types of image data. The imaging system is preferably positioned at a number of distinct vantage points. However, in one variation, the imaging system may include only a single image capture device. The image data is preferably video but can alternatively be a set of periodic static images. In one implementation, the imaging system may collect image data from existing surveillance or video systems. The image capture devices may be permanently situated in fixed locations. Alternatively, some or all may be moved, panned, zoomed, or carried throughout the facility in order to acquire more varied perspective views. In one variation, a subset or all of imaging devices can be mobile cameras (e.g., wearable cameras or cameras of personal computing devices). For example, the imaging system can be an application using the camera of a smart phone, smart glasses, or any suitable personal imaging device.

In a variation with a positioning configuration mode, the audio control configuration system 130 can enable other forms of position and/or orientation sensing to drive the dynamic setting of audio control inputs. In a positioning variation, the system can additionally include a person orientation sensing system 170 that functions to detect location, direction, and/or orientation of one or more subjects. Location, direction, and/or orientation may be used in a manner similar to the CV-based monitoring system 160 above, where the "attention" of one or more subjects can drive setting of audio control inputs, where "attention" is indicated by where the subjects direct their body. In one variation, an inertial measurement unit with accelerometers, gyroscopes, and/or a magnetometer may be coupled to a user and used in detecting the direction and possible approximating the location of a subject. In another variation, a GPS or local positioning system (RF triangulation/beaconing) may be used in getting location of a subject in an environment. This may be used in dynamically increasing volume for audio sources in close proximity of a subject and reducing or muting volume of audio sources outside of close proximity.

The audio generator 140 functions to generate an audio output according to the positional audio control inputs. The audio generator 140 more specifically modifies audio of the audio inputs into at least one audio output. The audio generator 140 can be configured to extract and substantially isolate audio sources for each location of an active audio control input, optionally apply audio processing operators if specified, and combine the isolated audio sources into an output. Multiple, custom audio outputs may also be generated from the same set of audio inputs.

The audio generator 140 may be integrated with or cooperate with the spatial audio analyzer 120. Preferably the audio generator 140 includes an audio source extraction engine 150 that functions to extract and preferably substantially isolate an audio source in a audio data representation. The recorded audio inputs can preferably be broken down into audio source channels associated with different locations. The audio compensator preferably operates on audio signal recorded by the microphone array to produce an output audio signal.

Figure 7:
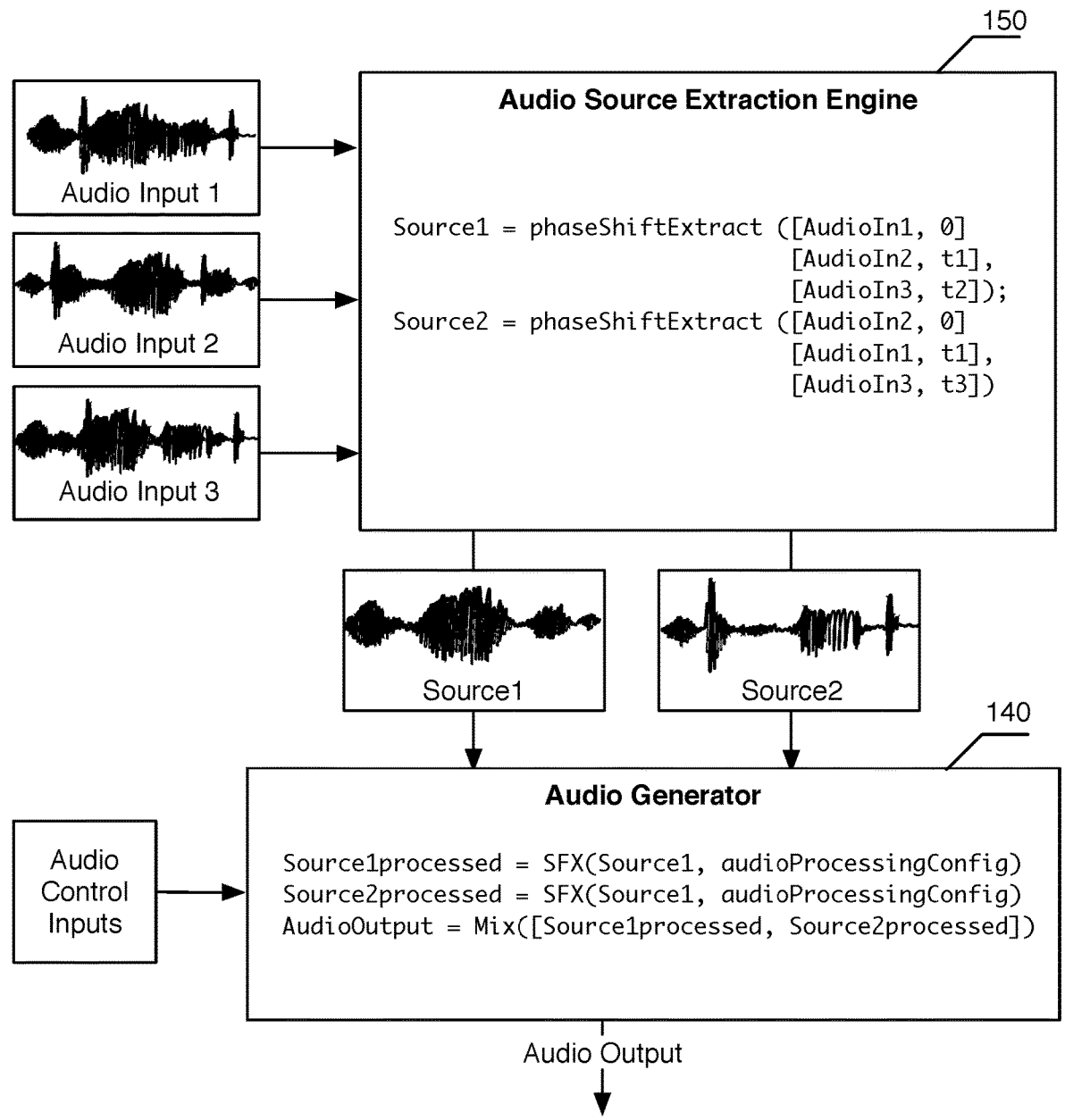
FIG. 7 is a schematic representation of extracting an audio source and generating an audio output.

The audio source extraction engine 150 can preferably facilitate applying phased alignment processing and/or the combining of multiple audio sources. The audio source extraction engine 150 may operate in combination with the audio generator, the spatial audio analyzer, and/or independently. As shown in example of FIG. 7, three audio inputs may record the audio from two sources. The two audio sources can be extracted, processed, and mixed. In another exemplary scenario, two audio sources may be extracted and enhanced with audio processing, a third audio source attenuated (e.g., "muted"), and then the two audio sources combined to form the audio output. Attenuation, amplification, filtering and other modifications can be applied independently or collectively to appropriate audio components. Additionally, constructive or destructive interference can be applied to the audio components or signals.

Figure 8:
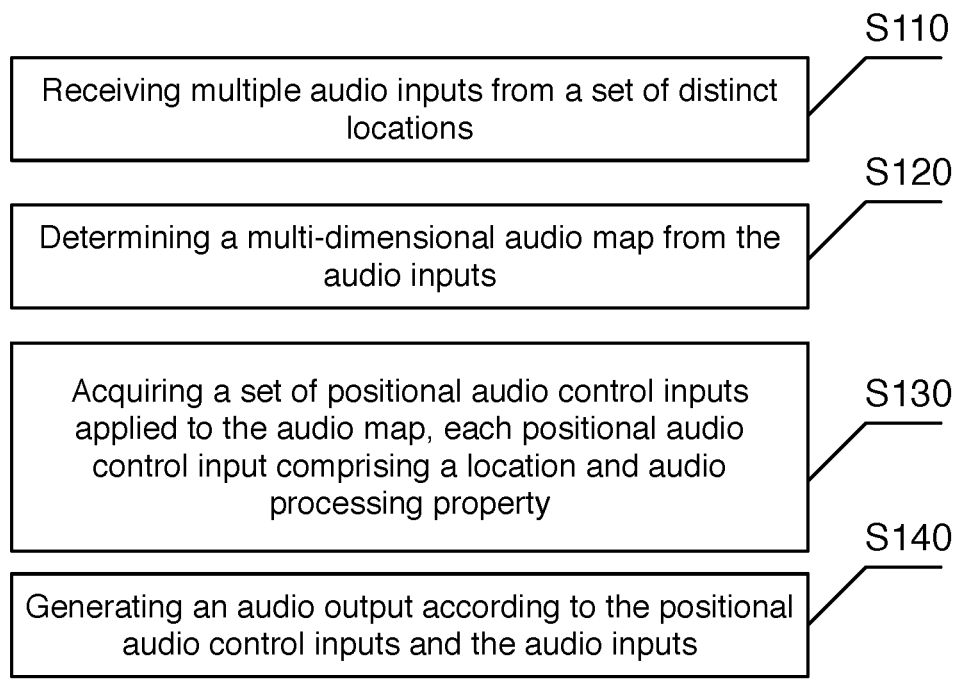
FIG. 8 is a flowchart representation of a method of a preferred embodiment.

In one variation, the audio generator 140 produces an audio output that can be played by any suitable audio system. Alternatively, the system may include an audio system (e.g., speaker system). In one example, the system can be integrated with listening devices (e.g., hearing aids), wired headphones, wireless headphones, and/or other suitable types of personal audio systems. The audio 3. Method for Differentially Locating and Modifying Audio Sources As shown in FIG. 8, a method for differentially locating and modifying audio sources of a preferred embodiment includes receiving multiple audio inputs from a set of distinct locations S110; determining a multi-dimensional audio map from the audio inputs S120; acquiring a set of positional audio control inputs applied to the audio map, each positional audio control input comprising a location and audio processing property S130; and generating an audio output according to the positional audio control inputs and the audio inputs S140. The method may additionally implement one or more configuration modes such as manual configuration, automatic configuration, semi-automatic configuration, CV-based configuration, agent sensing based configuration, and/or any suitable form of configuration. The method is preferably implemented by a system described above, but the method may alternatively be implemented by any suitable system. The method may be applied to a variety of use cases such as custom personal audio control, enhanced conferencing or meeting recording, enhanced hearing assistance, for enabling parallel audio-interfaces in an environment, and/or for any suitable application of the method.

Block S110, which includes receiving multiple audio inputs from a set of distinct locations, functions to use an array of microphones to record or otherwise sense audio signals. The distinct locations may be arranged to enable suitable locating of audio sources. In some variations, the detection and extraction of audio sources may be biased in particular directions or regions. The position of the microphones can additionally be critical in determining a multi-dimensional audio map used in identifying and isolating audio sources.

In one variation, receiving multiple audio inputs comprises recording audio from a microphone array that comprises distinct microphones positioned within an environment. The distinct microphones are preferably static or otherwise rigidly mounted at different points. For example, the microphones may be integrated into a imaging system collecting image data of the environment. In another implementation, the microphones may be physically coupled which may enable the relative positioning to be substantially known based on the structure to which the microphones are coupled. For example, a microphone array device may include a frame that ensures consistent positioning and orientation for the set of microphones.

In another variation, receiving multiple audio inputs comprises recording audio from a distributed set of computing devices and communicating the audio input from each personal computing device to a processing system. This variation can enable personal computing devices such as a smart phone, smart glasses, personal computer, or other suitable computing device to be used in establishing an audio map. Preferably, an application facilitates the cooperative recording of audio input from multiple locations. The recorded audio of each device can then be communicated to central location where the set of audio inputs can be processed in combination.

The method may additionally include calibrating of audio input positioning used in determining relative positioning between different recording devices. When integrated with an imaging system, the position of the microphones may be detected visually. In one implementation where microphones are coupled to image capture devices, visual interpretation of the scene and overlapping fields of view may be used to predict relative positions of the image capture device and thereby predicting relative positions of audio inputs. In another implementation, multiple applications open for use as an audio input may be visually detected and used in determining relative position. In another variation, the relative position of the microphones may be approximated by a user. For example, a user may tap in a control application the locations of used microphones. Locations of potential audio sources (e.g. such as where the user and friends are sitting).

Block S120, which includes determining a multi-dimensional audio map from the audio inputs, functions to use audio triangulation and/or other audio processing techniques to approximate where particular components of an audio signal originated.

Determining a multi-dimensional audio map preferably creates a spatial mapping of the originating location of audio sounds that are recorded in the environment. Audio generally originates from some point or small region as in the case of a person talking. The fidelity of location may be generalized to general regions in a space. The phase-shifted differences of audio sounds as recorded by different audio inputs can be translated to displacement and/or position information. Signal processing, machine learning, heuristic-based processing and/or other techniques may be applied in the generation of an audio map.

In one implementation, determining a multi-dimensional audio map includes triangulating an at least approximate location of audio sounds identified in at least a subset of audio inputs. This may additionally include detecting of audio features across multiple audio inputs and calculating the time differences. Audio features as used herein are detectable segments or components of source that can be associated with an audio source. Audio features can be time-domain patterns, frequency domain patterns, and/or any suitable other analysis of audio signal. As the method may encounter multiple overlapping audio sources, audio feature detection preferably works during interference. Shared audio features may additionally be identified in audio inputs with time delay phase shifts (except in scenarios such as when the audio source is equidistant from the microphones). The time delays can then be used in using the time of flight of sound in triangulating the location.

In some variations, supplemental sensing such as CV-based monitoring of people and other audio sources can be used in generating the audio map and/or in assisting the generation of an audio map. In one alternative variation, the audio map could be entirely based on potential audio sources. For example, a CV-based monitoring system may identify the people in the room and location and that could be used as potential audio sources. Each person could be assigned an audio control input, and if audio is detected originating from tracked location of that person, then the audio control input assigned to that person could be used.

Block S130, which includes acquiring a set of positional audio control inputs applied to the audio map, functions to set how audio is to be modified based on the positional source of different sounds. The set of audio control inputs are preferably used in collectively defining how different audio "channels" from different locations are used in generating an audio output in block S140. A positional audio control input preferably has a location property, optionally a dimension to define a region around the location, and optionally one or more audio processing properties that characterize different audio modifications or computing operations to be made in association with audio emanating from that location. A default audio processing property may specify no additional processing beyond extraction. An audio control input may additionally be associated with an object identified through the audio map, image data, or other suitable data. The object association may enable the audio control input to maintain association as the object is tracked. In such an object-associated implementation, the audio control input may or may not include a location property.

The audio control inputs may be acquired or set in a variety of configuration modes such as a manual mode, an automatic mode, semi-automatic mode, CV-based monitoring mode, agent sensing mode, and/or any suitable mode of configuration. Different audio control inputs may be set using different configuration modes.

Figure 9:
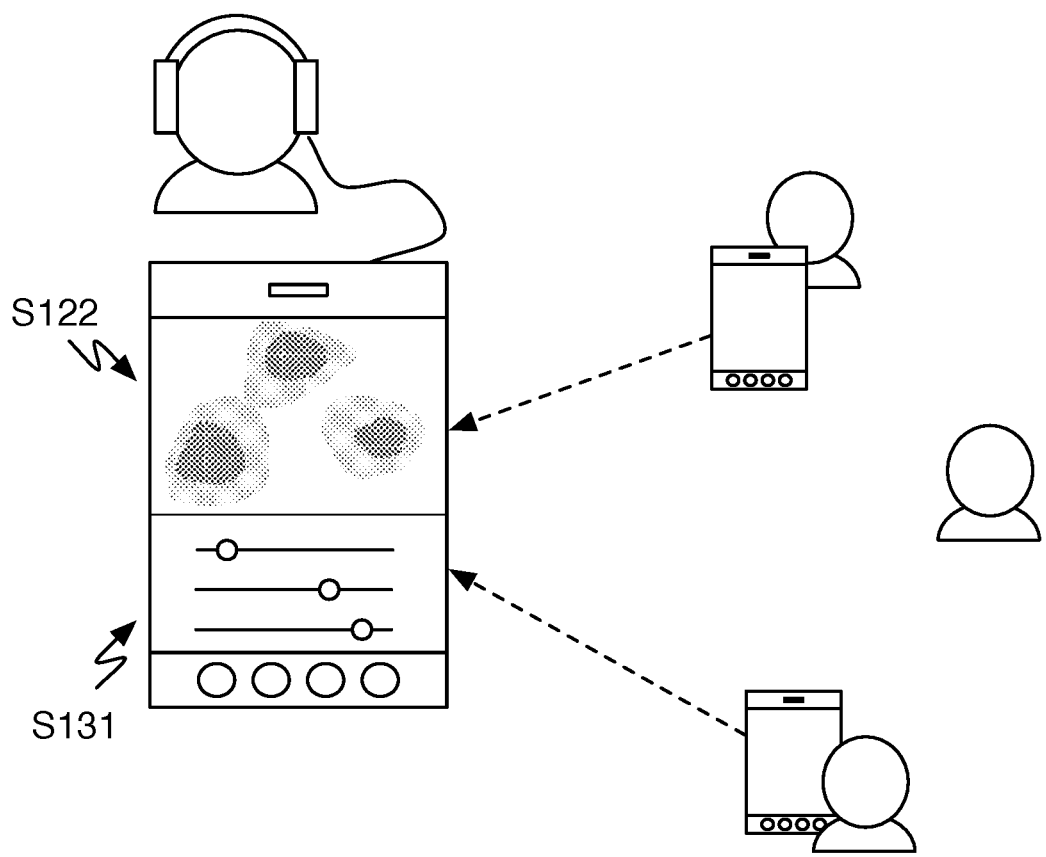
FIG. 9 is a schematic representation of a method representing an audio map in a user interface for manual configuration.

In a manual configuration mode variation, a user can use a representation of the multi-dimensional map of audio sources to set one or more positional audio control inputs. Accordingly, the method may additionally include presenting a representation of the audio map in a user interface S122 and acquiring a set of audio control inputs at least partially through interactions with the representation of the audio map S131 as shown in the exemplary implementation of FIG. 9. The manual configuration mode is preferably facilitated through an application or device with a graphical user interface, though other suitable mediums of a user interface including a programmatic user interface (e.g., API) may also be used.

Presenting a representation of the multi-dimensional map of audio sources S122, functions to communicate the relative position of various audio sources to a user. Preferably a two- or three-dimensional graphical representation of the audio landscape is presented. In one variation, the live audio signal can be animated in the graphical representation. In another variation, the graphical representation may only mark potential location of an audio source. While presenting the audio map may be used for setting audio control inputs, the representation of the audio map may additionally or alternatively facilitate other uses. For example, a phone conferencing device could use a generated graphical representation of speakers sharing a phone for the benefit of other conference members who are listening remotely.

Setting of an audio control input through interactions with a representation of the audio map can involve a user selecting a location and/or region on a graphical representation and thereby setting the location property of an audio control input. In one implementation, a graphical representation of the audio map can be presented within an application. An audio control input can be created to be associated with that selected location and/or region, and then the user can set various audio processing properties. For example, a user could set the volume, muting the audio source, selecting sound effects, setting additional processing (e.g., recording or saving a transcription), and the like.

Figure 10:
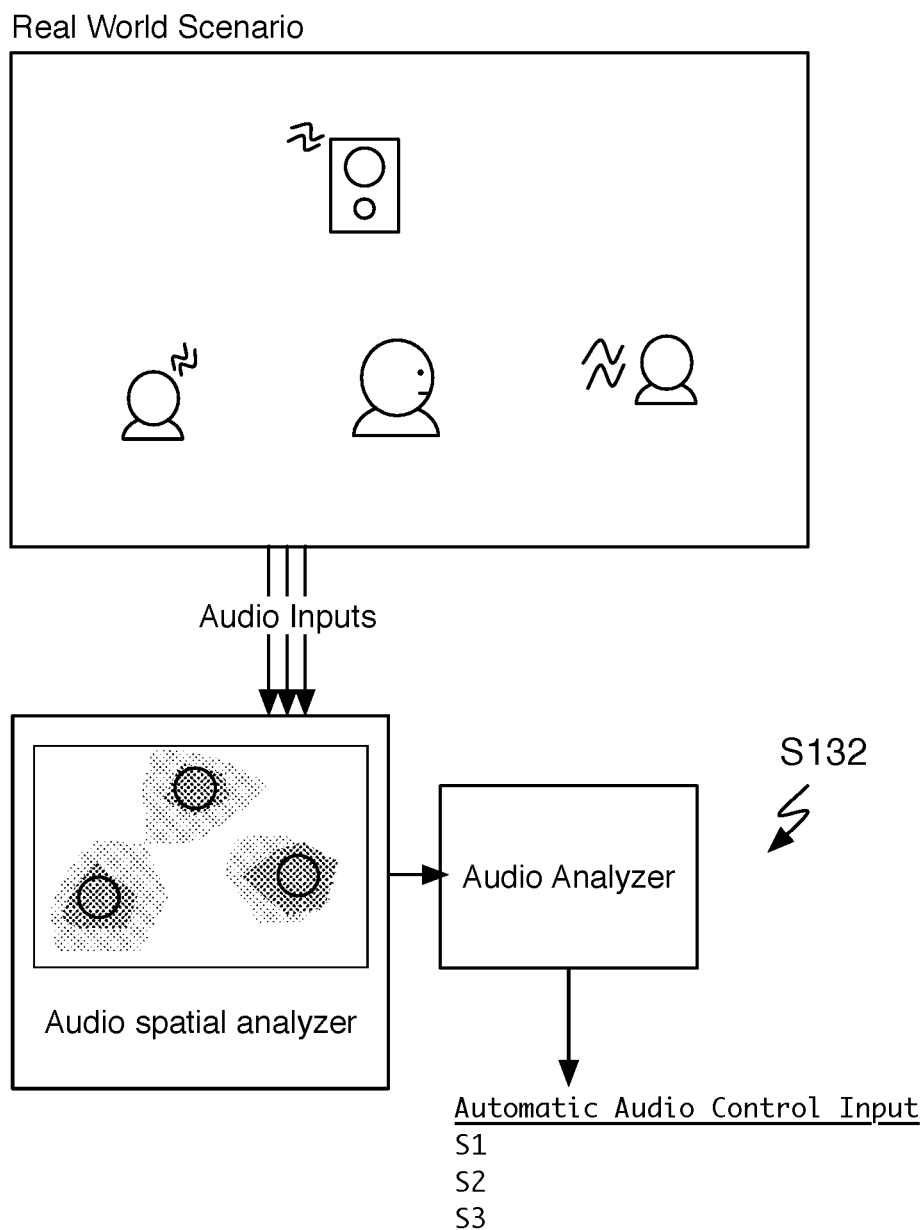
FIGS. 10 and 11 are schematic representations of variations using an automatic configuration mode.

In a manual configuration mode variation, audio control inputs may be automatically set in part or whole. Automatic configuration can be used to set a location property and/or an audio processing property. Additionally, automatic configuration may be used to dynamically update the audio control inputs to In one variation, acquiring at least one positional audio control input includes automatic detection audio source locations and setting of an audio control inputs at the detected audio source locations S132 as shown in FIG. 10. Automatic detection of an audio source can be used by applying a classifier on the audio map to detect probably audio sources. Characteristics of an audio source will generally be consistent generation of audio of similar properties from a focused area. The location property can additionally be updated so that the source of audio can be tracked as the source moves.

In another variation, one or more audio processing operators may be automatically set for an audio control input without user input. The manner of automatic setting can take a variety of forms such as audio source classification, audio content analysis, contextual analysis, and/or other approaches.

Audio sources may be classified based on the type of audio generated from that location or through other classification approaches (e.g., visual classification), and that classification can be used to set preconfigured audio processing operators. For example, a speaker may receive an operator to enhance speech audio, while a speaker playing music may receive an operator to balance music audio.

Figure 11:
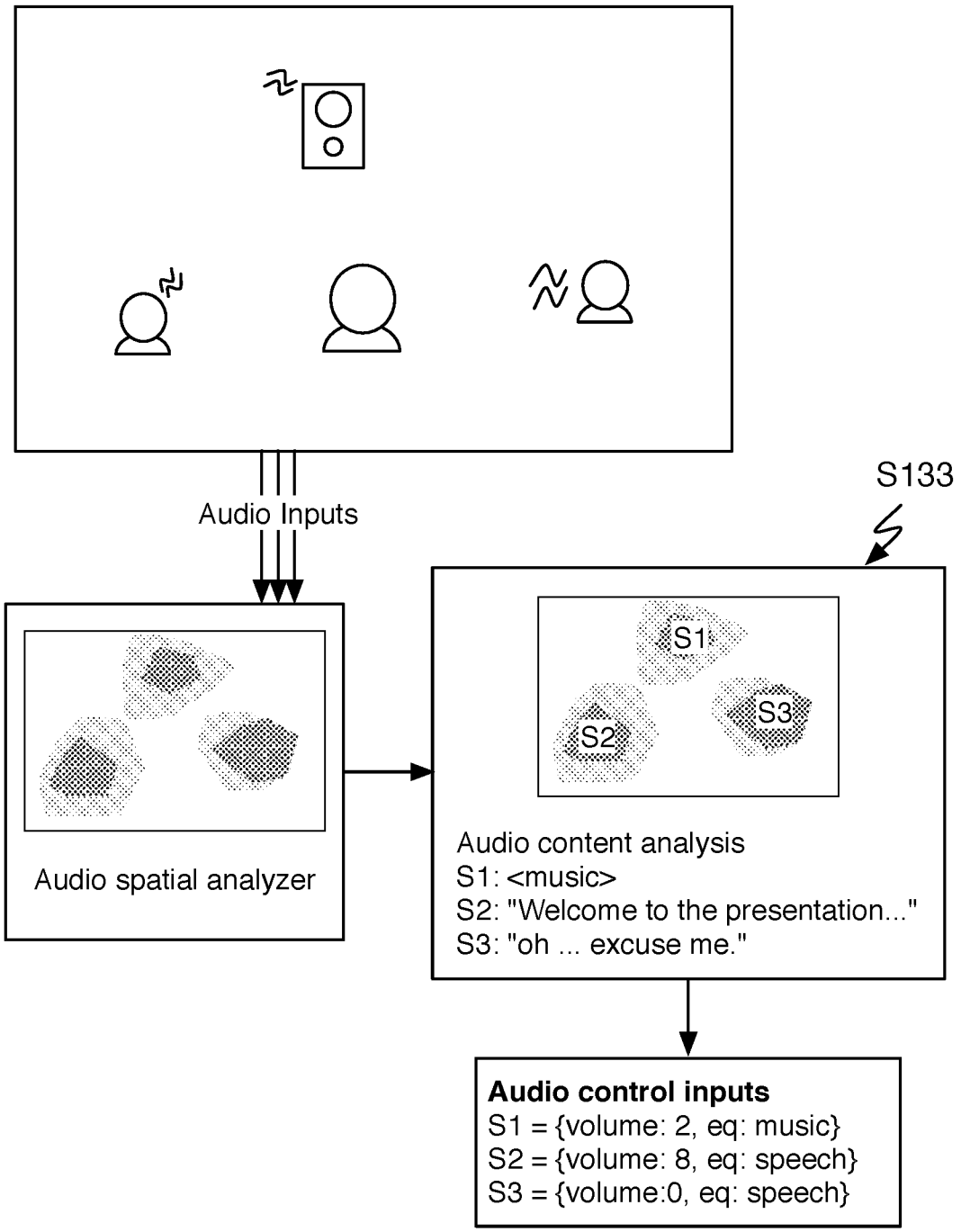

Audio content analysis may additionally be used in determining the settings of audio control inputs. Acquiring an audio control input in one instance may include applying audio content analysis on audio isolated from the audio source location and setting an audio processing property of the audio control input based on the audio content analysis S133 as shown in FIG. 11. The audio content analysis can include performing speech to text, performing sentiment analysis, content analysis on the spoken words, and/or other suitable forms of content analysis. Achieving content analysis may involve initially extracting an audio source so that the content of the audio source can be analyzed.

As a related variation of automatic content analysis, contextual analysis may use various inputs that indicate the situation. In one example, if the user sets to amplify a speaker near him and mutes sounds coming from behind him, the system may automatically detect that the user is likely having a conversation and can decrease the audio of other audio sources other than speakers near him.

Content analysis as well as contextual setting of an audio control input may be used for audio control inputs that were initialized or that were in some part set by a user.

Figure 12:
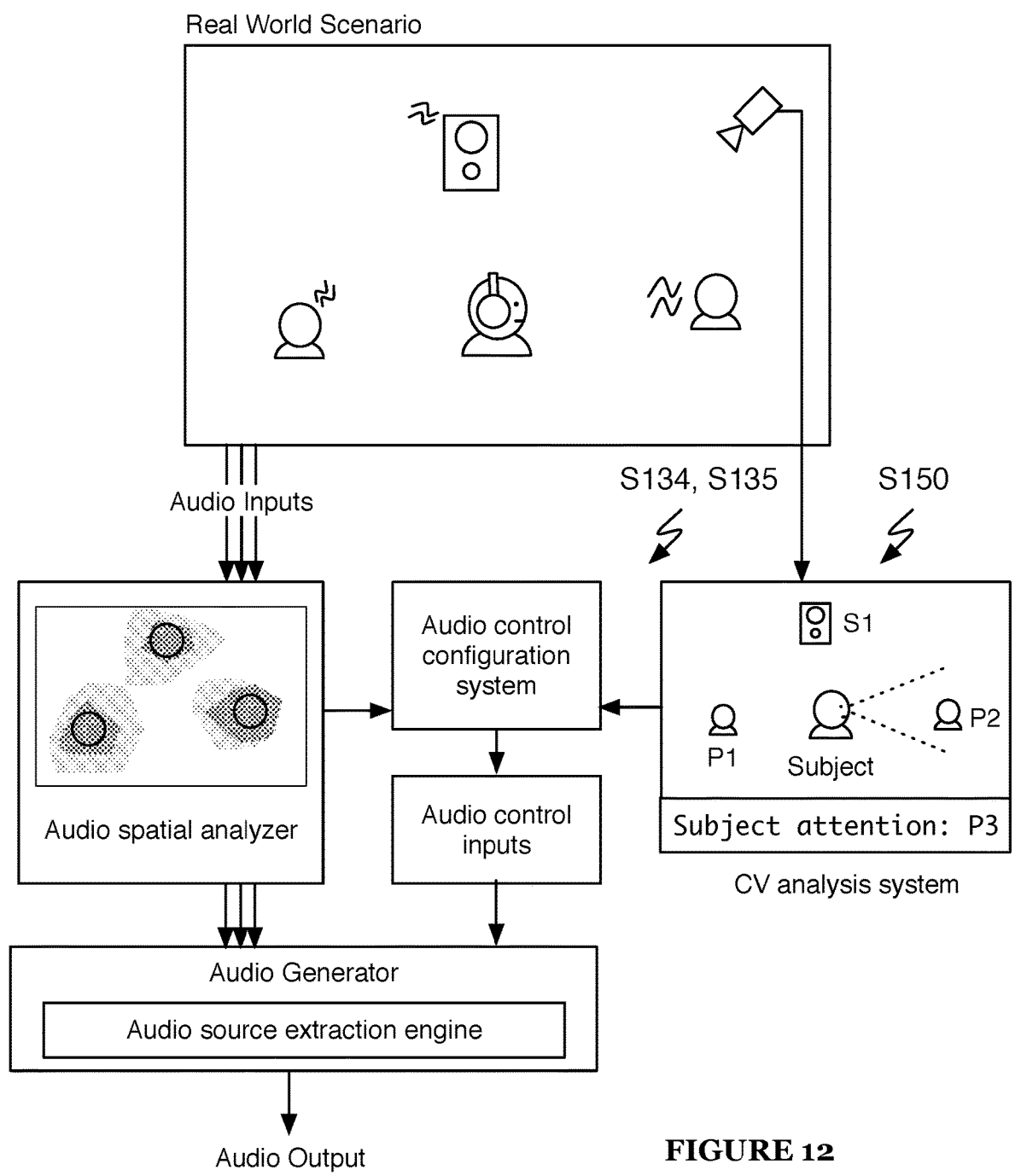
FIGS. 12 and 13 are schematic representations of variations using a computer vision based configuration mode.
Figure 13:
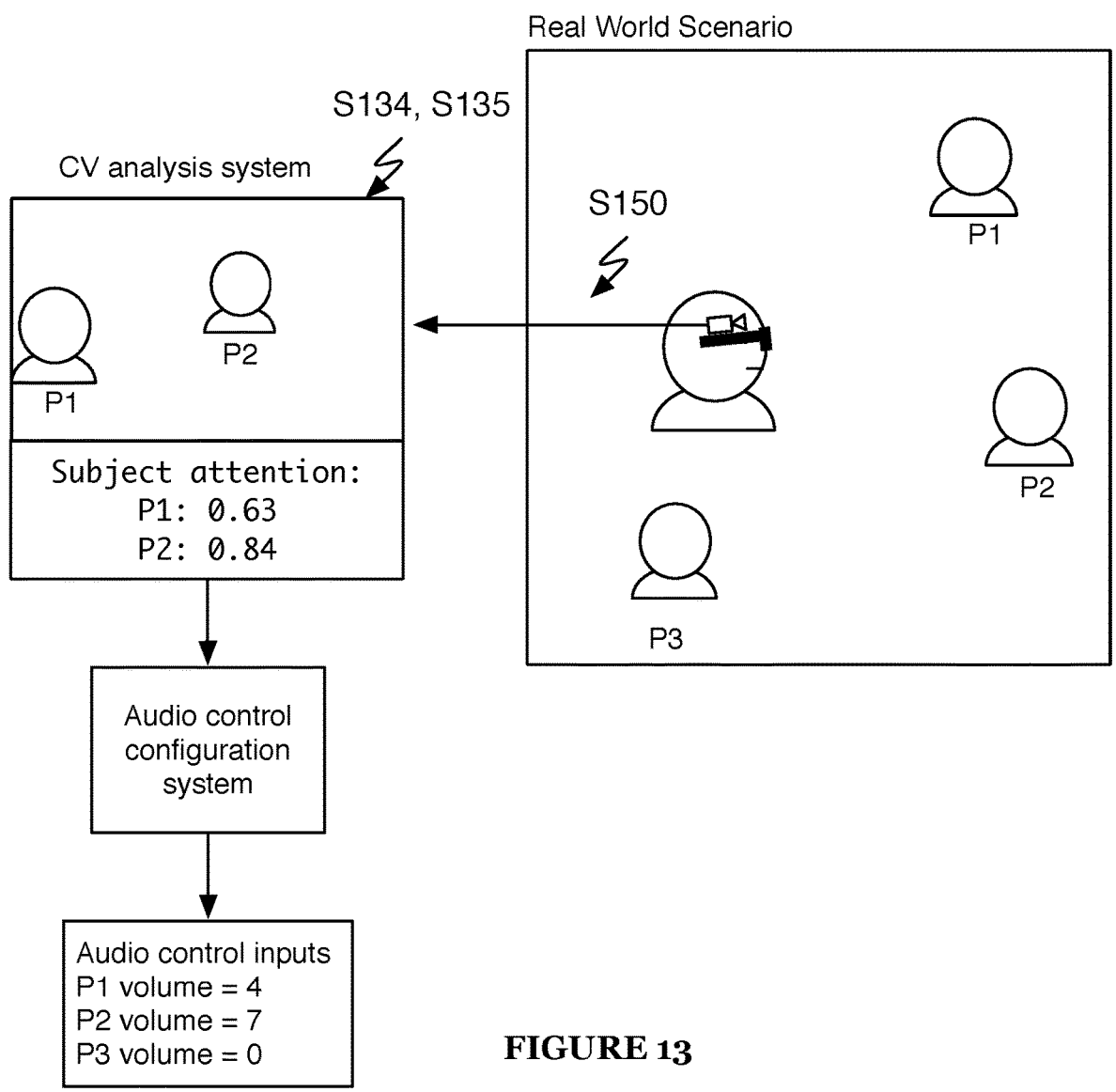

In a CV-based monitoring mode variation, audio control inputs may be at least partially set and/or updated in response to CV-based modeling of image data collected from the environment. Accordingly, the method may include collecting image data and applying computer vision interpretation of the image data S150; and at least partially setting a positional audio control input in response to the computer vision interpretation S134 as shown in FIG. 12. The image data used in interpreting the environment is preferably image data of at least a portion of the environment covered by the audio map. Imaging data can be collected from one or more statically fixed imaging device. Such an imaging device will generally have a third person view of an agent (e.g., a person, machine, etc.). Imaging data may alternatively be collected from a personal imaging device that is coupled to the agent as shown in FIG. 13. In this example, the imaging data may not be a visual observation of the agent, but can reflect the view of the agent (e.g., what the agent is viewing or what may be viewable by the agent).

CV-based modeling of image data can include performing object classification and/or identification, object tracking, biometric identification of a person, gesture detection, event detection, interaction detection, extraction of information from a device interface source, scene description, 2D or spatial modeling, and/or any suitable form of image analysis. Preferably, the CV-based modeling can detect people and optionally other objects (in particular those that may generate sound like a speaker system, a television, a telephone, a machine, etc.). Detected objects can preferably be mapped to audio sources of an audio map.

In one particular variation, CV-based modeling is used to detect the focus of a person and update the set of audio control inputs so that an audio output generated for that person corresponds to the direction of the person's attention. Accordingly, applying computer vision interpretation can include detecting direction of attention by an agent and updating the audio control inputs in response the direction of attention by the agent S135 as shown in FIG. 12. The agent is preferably also the same subject for whom the audio output is generated, which may be used in to customize audio mixing to include audio sources that a subject focuses on. Detecting the direction of attention can be detecting body position (e.g., direction of the front of the body, the head, or the eyes). In one preferred implementation, gaze analysis may be performed to detect the direction of a person's visual focus. More generally, direction of attention may be used to narrow the audio sources of interest to the audio sources in the "field of view" of the agent. When the imaging device is part of a wearable computing device (e.g., smart glasses), detection of an audio source in the image data can be used to detect which audio sources should be activated.

The subject of attention may also impact how the audio control input is set. In one variation, different audio sources may be assigned different priorities. For example, an audio source of higher priority may be incorporated in the audio output even when on the periphery of the field of view, and an audio source with a lower priority may be limited to incorporation into the audio output when a centered focus of an agent's attention.

Figure 14A:
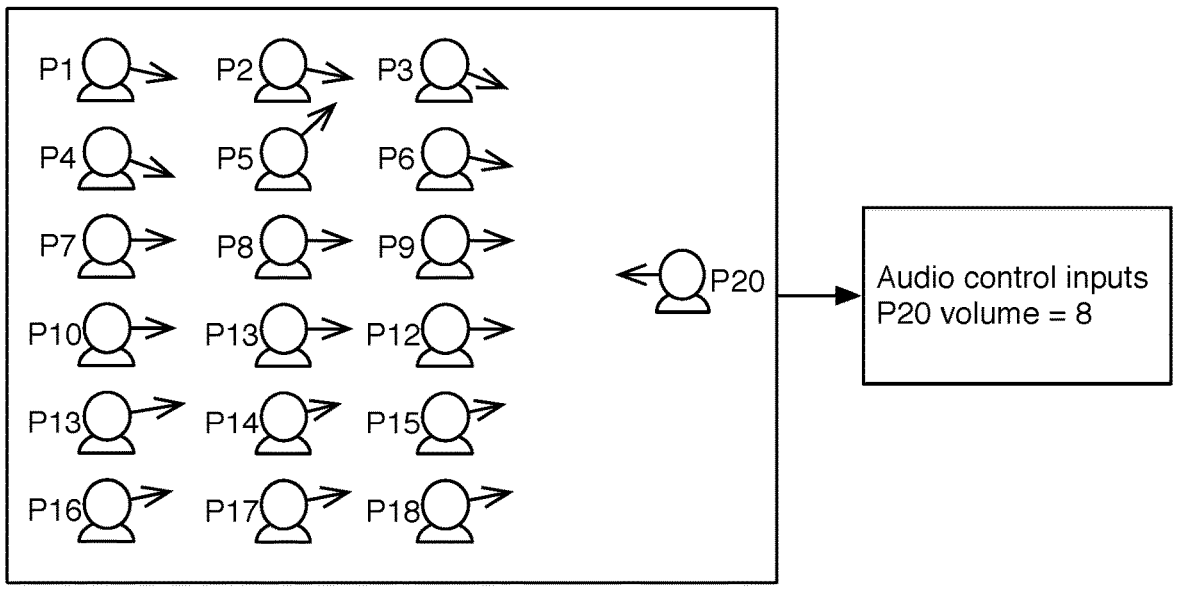
FIGS. 14A and 14B are schematic representation of a variation using group attention detection.
Figure 14B:
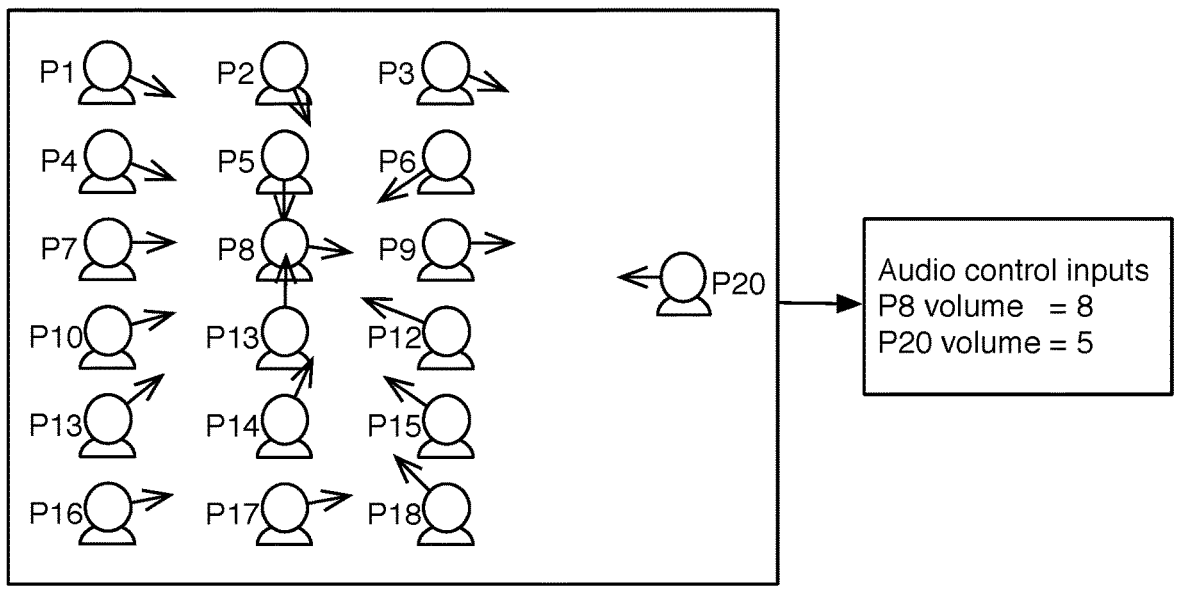

In a similar variation, CV-based modeling of an agent's direction of attention may be applied across multiple agents in the environment. The audio control inputs can be updated in response to collective direction of attentions by multiple agents. This may be done when mixing the audio for a presentation, when most of the attendees are watching the speaker that audio may be amplified as shown in FIG. 14A. However, if a large number of attendees direct their attention to a fellow attendee then that attendee may be amplified (e.g., if someone asks a question during a presentation) as shown in FIG. 14B. The different agents may additionally be ranked or otherwise prioritized when collectively analyzing the attention of a group of agents.

Figure 15:
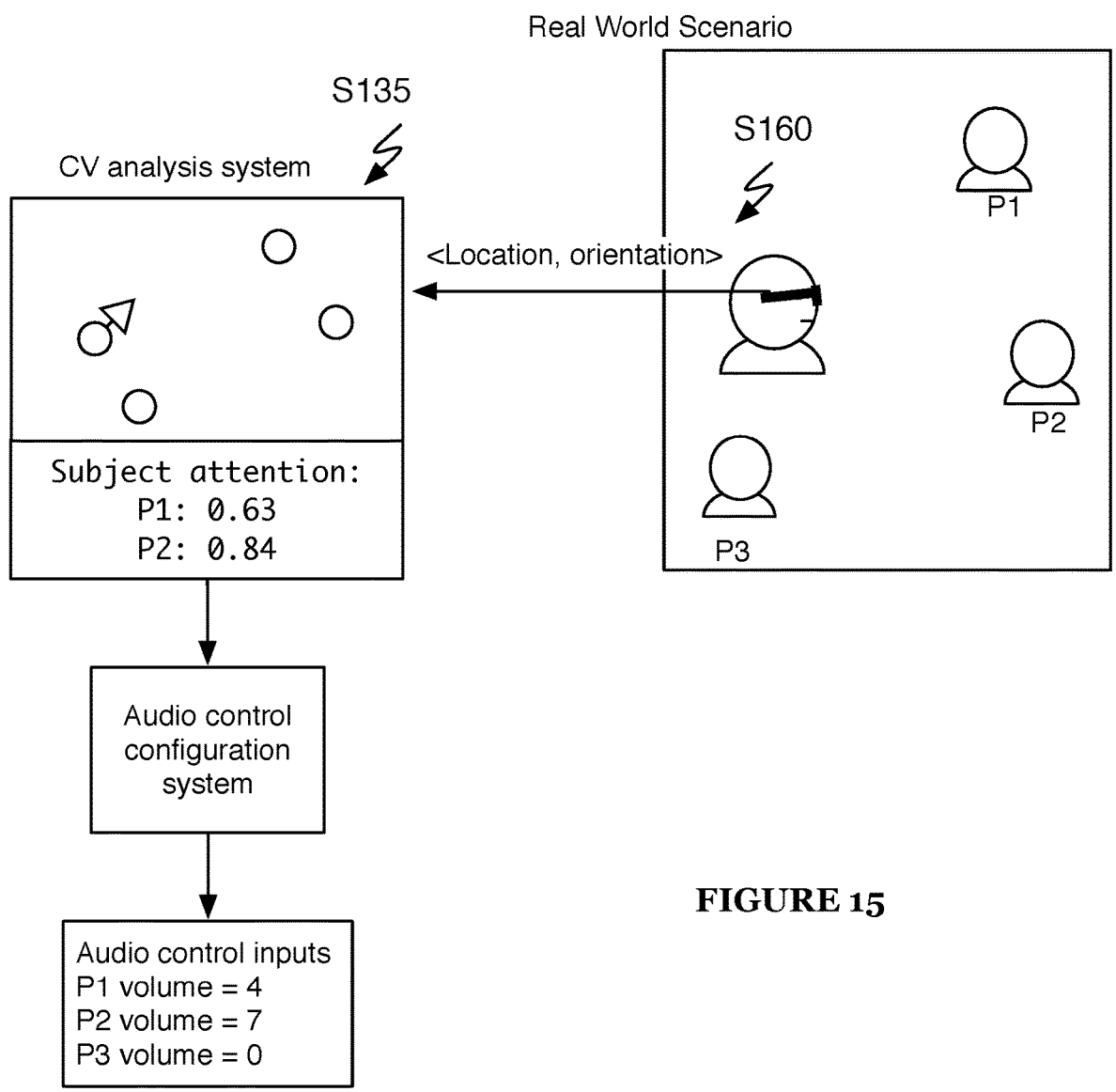
FIG. 15 is a schematic representation of a variation using a person environment orientation configuration mode.

In a related agent orientation sensing variation, audio control inputs may be at least partially set and/or updated in response agent environment orientation of one or more agents. Accordingly, the method may include collecting agent environment orientation from a sensing device S160; and at least partially setting a positional audio control input in response to agent orientation within the environment compared to the audio map S135 as shown in FIG. 15. Here environment orientation can include agent position within the environment and/or agent direction/orientation (e.g., direction of front of body, angle of head, etc.). As above the agent is preferably a person but may be any suitable entity. Collecting agent environment orientation can include sensing position using GPS, local positioning, Bluetooth beaconing, CV-based position tracking, and/or any suitable form of positioning. For example, an application on a smart phone or smart wearable may supply position data of the wearer. Collecting agent environment orientation may additionally or alternatively include sensing or collection of agent directional orientation, which can include where the person is facing, the direction of the head, and the like. For example, smart glasses equipped with an inertial measurement unit (IMU) that includes an accelerometer, a digital gyroscope, and/or a magnetometer may be used in sensing the angle and direction of the smart glasses. The variations of the CV-based monitoring variations may similarly be applied. For example, based on the environment orientation, the method may determine the audio sources in near proximity and/or in the direction of attention of a person, and appropriately set the audio processing properties for audio sources of interest. This variation may be used in generating audio output for one person (e.g., the agent being monitored for environment orientation). This variation may alternatively be used in generating audio output based on environment orientation of multiple agents and determining some form of group consensus.

The various modes of configuration may be used individually, in parallel (e.g., different audio control inputs set based on different configuration modes), and/or in combination. For example, a set of audio control inputs may be partially set by audio content analysis and CV-based monitoring. In particular, CV-based monitoring may be used to determine primary audio sources of interest based on direction of attention, and of these audio sources audio content analysis can determine the audio sources producing audio of interest to a subject.

Block S140, which includes generating an audio output according to the positional audio control inputs and the audio inputs, functions to change or augment the audio input to approximate the requests conveyed through the audio control inputs. In effect, the audio control inputs treats the different locations of the audio map as audio channels that can be mixed, processed, or otherwise used in producing some result.

The generating of an audio output preferably involves the processing or extraction of audio sources if not already processed/extracted, and then the collective processing of multiple audio sources (e.g., mixing together into a single audio output.

Accordingly, generating the audio output can include, for an audio control input, at least partially extracting an audio source from the audio map as indicated by the location property of the audio control input and applying an audio transformation indicated by the audio processing property of the audio control input. Extracting an audio source preferably involves the collaborative use of multiple audio inputs to enhancing sounds originating from the location while possibly deemphasizing or quieting sounds in the audio input not originating from the location. The extraction preferably functions to substantially isolate an audio source that is an audio signal representative of audio from that location. The extraction in some ways is like generating a virtual audio recording from that location (as opposed to the actual audio recording at the real locations of the audio inputs). Extracting the audio source in one preferred implementation can include applying phased alignment processing of at least a subset of the audio inputs (e.g., two or more). The phased alignment processing is preferably configured to substantially isolate audio at the location property. The phased alignment processing preferably accounts for the displacements between the microphones used to record or sense the audio input, and applies a time shift to the set of audio inputs to account for the time displacements, which functions to substantially align the audio features originating from that location in time. Then the audio inputs can be combined to reinforce aligned audio features. Audio originating from audio sources outside of the targeted location are preferably not reinforced and may be actively minimized so that the resulting output for an audio source reflects some measure of isolation of the audio source. For example, extracting an audio source of a person speaking preferably results in an audio source data representation where other contributors to sound in the environment are minimized and the speaker is more clearly emphasized.

Generating the audio outputs can additionally include applying the audio processing operators to the audio sources. Various techniques may be used in amplifying, deamplifying, equalizing, compressing, and/or applying audio effects such as filtering, changing speed, shifting pitch, and the like. Finally, the audio output can be a combination of multiple audio sources. For example, an implementation configured to monitor the speaking of two speakers will generate two audio sources at the location of each speaker and then combine the audio source data representations to form one audio output.

The audio output can be any suitable form of audio output such as a mono-channel audio output, stereo audio output, a 3D audio output, or any suitable form of audio output. For example, head-related transfer functions may be used in combination with audio source location to preserve the positional aspects of the audio. Such audio-effects can similarly be made to break from reflecting true life and can be set to have any suitable effect.

The method is preferably used for producing audio for one or more subjects. The subjects are generally people. In one implementation, the audio output is produced for a particular subject. In the case of CV-based configuration or orientation sensing configuration, the subject associated with the audio output will generally also be the monitored agent during configuration. The audio can be played in real-time, but may additionally be recorded for later playback. A person may use headphones, a hearing aid, a speaker system, or any suitable system to listen to the audio output. The audio output could similarly be generated and played for a number of people. For example, when used for managing audio during a conference call or a presentation, the audio can be played over a speaker system intended for multiple people.

In one variation, the audio output is played by a listening device. As discussed above, one implementation may use the presentation of an audio map within a user interface of a listening application. The listener can use the application to set and update the audio control inputs. Furthermore, such an implementation may synchronize and use multiple application instances. Configuration of audio control input could be shared across multiple people. Additionally, multiple application instances may facilitate the acquisition of audio inputs. For example, someone using a listing device during a meeting may ask others to connect their listing applications so that a microphone array can be generated ad-hoc to implement the method so the listener can hear the conversation better.

Figure 16:
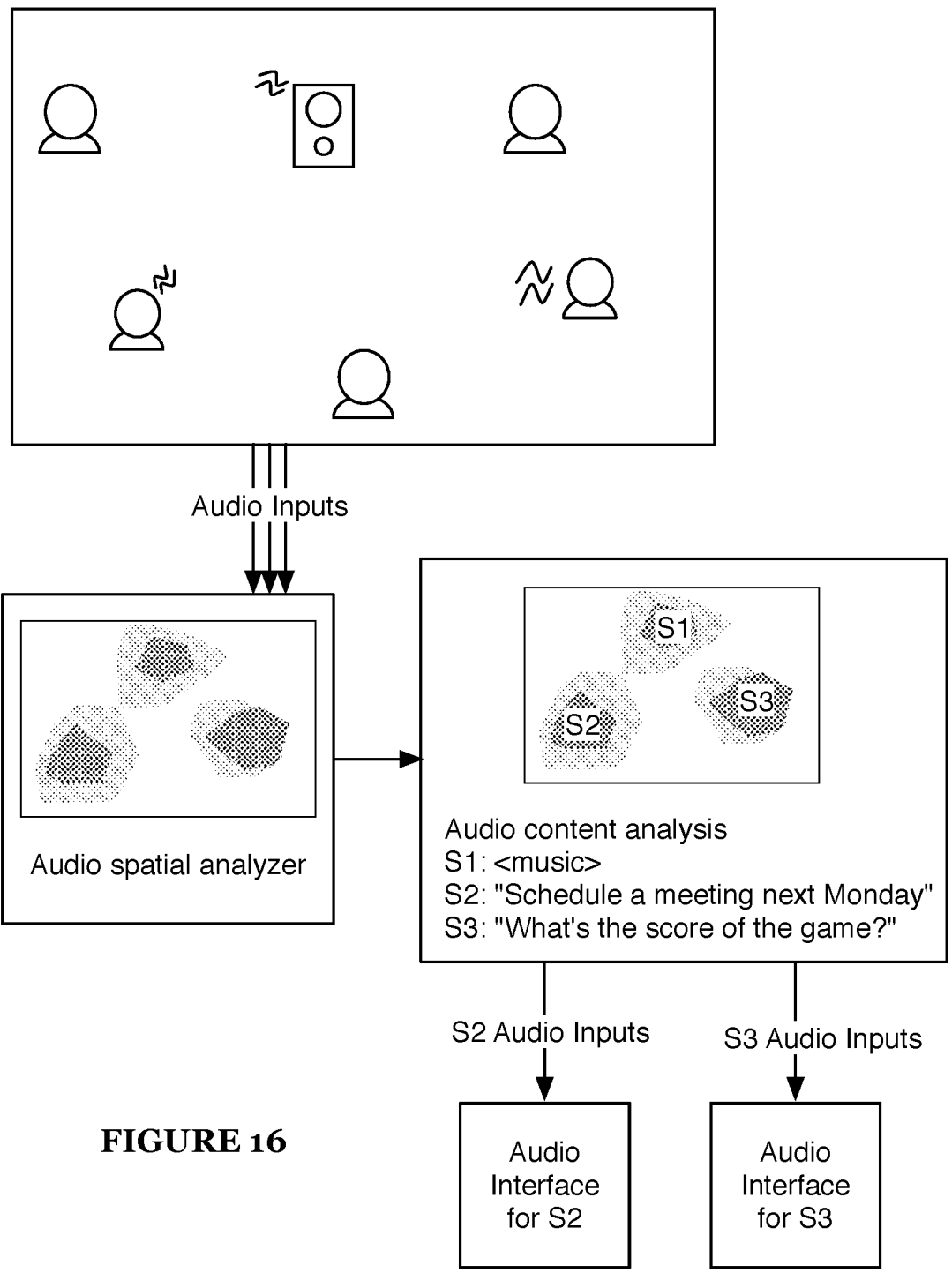
FIG. 16 is a schematic representation of applying the audio output to a audio user interface.

In an alternative variation, the audio output may not be directly played for the purposes of generating sound. The audio output can be used for other purposes such as record keeping, input to a computer system, and/or other purposes. In one preferred variation, the method includes communicating the audio output to an audio-based user interface system as shown in FIG. 16. An audio-based user interface system is generally a computing system that uses spoken input to direct actions of a computing device. An audio-based user interface can be a digital personal assistant, or any suitable voice-interface. In one particular implementation, the identification of different audio sources and the custom extraction of distinct audio sources can be used in a crowded environment so that one system may be used in collecting and managing voice commands from different people. For example, in a store employing this method possibly in combination with some CV-based application (e.g., automatic self checkout), the different customers could issue voice commands that can be extracted, uniquely associated with the customer, and used by the customer to direct system interactions. In another variation, this can be used to follow voice commands of select people with privileges to issue voice commands. For example, CV-monitoring system can identify three people as having control over a set of network devices (e.g., lights in a room, a sound system, a presentation system, etc.), and the method is then used to only use audio extracted from those three people as voice commands.

Another capability of the method can be to generate multiple distinct audio outputs from shared audio inputs. Preferably, a second set of audio control inputs can be acquired using any of the variations described above, and a second audio output can be generated using the second set of audio control inputs and the audio inputs. In this way, one audio output may be generated to facilitate one person listening to two particular speakers, and a second audio output may be generated to facilitate another person listening to three different speakers. As the method facilitates the synthesizing of different audio source based channels, these channels can be mixed in different ways for different audiences or purposes. These audio outputs can be played or as discussed above used for other purposes such as input for an audio-based user interface system.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for customized audio based on spatial analysis comprising:
   receiving multiple audio inputs from a plurality of microphones at a set of distinct locations in an environment;
   determining a multi-dimensional positional audio map from the audio inputs, the audio map mapping an approximation of originating locations of sounds in the environment;
   setting a set of positional audio control inputs, each audio control input specifying a location property associated with a region of the audio map and an audio processing property; and
   generating an audio output according to the audio control inputs and the audio inputs.

2. The method of claim 1, wherein generating the audio output comprises, for at least one instance of the audio control inputs, at least partially extracting an audio source from the audio map as indicated by the location property and applying an audio transformation indicated by the audio processing property on the audio source that was at least partially extracted.

3. The method of claim 2, wherein generating the audio output further comprises partially extracting at least a second audio source from the audio map combining at least two audio sources and thereby generating the audio output.

4. The method of claim 2, wherein extracting an audio source from the audio map comprises applying phased alignment processing of at least a subset of the audio inputs, the phased alignment processing configured to isolate audio at the location property.

5. The method of claim 1, further comprising presenting a representation of the audio map in a user interface; wherein setting the set of audio control inputs is at least partially defined through interactions with the representation of the audio map.

6. The method of claim 5, wherein setting an audio control input defined through interactions with the representation of the audio map comprises setting a location property of the audio control input through selection of a location on the representation of the audio map and setting an audio processing property within the user interface.

7. The method of claim 1, wherein setting at least one audio control input comprises automatic detection of audio source locations and setting audio control inputs at the detected audio source locations.

8. The method of claim 1, wherein setting at least one audio control input of the set of audio control inputs further comprises applying audio content analysis on audio extracted from the audio source location and setting an audio processing property of the audio control input based on the audio content analysis.

9. The method of claim 1, further comprising communicating the audio output to an audio-based user interface system.

10. The method of claim 1, wherein the audio output is generated in association with a first person; and further comprising setting a second set of positional audio control inputs applied to the audio map; and generating a second audio output in association with a second person, the second audio output being generated according to the second set of audio control inputs and the audio inputs.

11. The method of claim 1, wherein receiving multiple audio inputs comprises recording audio from a distributed set of personal computing devices and communicating the audio input from each personal computing device to a processing system.

12. The method of claim 1, wherein receiving multiple audio inputs comprises recording audio from a microphone array comprised of distinct microphones positioned within an environment.

13. The method of claim 1, further comprising playing the audio output in a personal listening device.

14. The method of claim 13, further comprising presenting a representation of the audio map in a user interface of an instance of a listening application.

15. The method of claim 14, wherein receiving multiple audio inputs comprises a set of associated application instances each receiving an audio input.

16. The method of claim 1, further comprising collecting image data; applying computer vision interpretation of the image data; and at least partially setting an audio control input in response to the computer vision interpretation.

17. The method of claim 16, wherein applying computer vision interpretation comprises detecting direction of attention by a person, and updating the audio control inputs in response the direction of attention by the person.

18. The method of claim 17, wherein the audio output is played on a speaker system associated with the person.

19. The method of claim 16, further comprising detecting direction of attention by multiple people, and updating audio control inputs in response to collective direction of attention by multiple people.

20. The method of claim 16, further comprising isolating an audio source from at least one location as indicated by an audio control input; applying audio content analysis on the audio source; and wherein setting an audio control input is additionally partially set in response to the audio content analysis.

21. The method of claim 16, wherein collecting image data comprises collecting image data from at least one statically fixed imaging device remotely observing the person.

22. The method of claim 16, wherein collecting image data comprises collecting image data from a personal imaging device coupled to the person.

23. The method of claim 1, further comprising collecting person environment orientation from a sensing device; and at least partially setting an audio control input in response to person environment orientation within the environment compared to the audio map.

24. A system for customized audio based on audio source position comprising:
- a set of audio microphones at distinct locations in an environment;
- a spatial audio analyzer configured to produce a multi-dimensional positional audio map from audio input received from the set of audio microphones, the audio map mapping an approximation of originating locations of sounds in the environment;
- an audio configuration system configured to acquire and set a positional audio control inputs that defines audio processing for at least one location of the audio map; and
- an audio generator comprising an audio source extraction engine that is configured to extract an audio source from the audio map at a location of the positional audio control, the audio generator further configured to generate an audio output with the audio processing of the positional audio control input applied to the audio source.

25. The system of claim 24, wherein the audio control input configuration system comprises a graphical control interface wherein multiple audio control inputs can be graphically mapped to an interface representation of the audio map.

26. The system of claim 24, further comprising:
- an imaging system configured to collect image data;
- a computer vision analysis system configured to generate a visual interpretation from the image data; and
- wherein the interpretation is an input to the audio configuration system used in setting at least one audio control input.

27. The system of claim 24, further comprising a person positioning and orientation sensing system configured to determine position and orientation of at least one agent; and wherein the position and orientation of the agent relative to the audio map is an input to the audio configuration system used in setting at least one audio control input.

* * * * *